(12) United States Patent
Fujimoto et al.

(10) Patent No.: US 7,979,052 B2
(45) Date of Patent: Jul. 12, 2011

(54) COMMUNICATION METHOD, COMMUNICATION SYSTEM, KEY MANAGEMENT DEVICE, RELAY DEVICE AND RECORDING MEDIUM

(75) Inventors: Shingo Fujimoto, Kawasaki (JP); Ryuichi Matsukura, Kawasaki (JP); Motoshi Sumioka, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 893 days.

(21) Appl. No.: 11/928,691

(22) Filed: Oct. 30, 2007

(65) Prior Publication Data

US 2008/0102798 A1 May 1, 2008

(30) Foreign Application Priority Data

Oct. 30, 2006 (JP) ................. 2006-294662
Aug. 30, 2007 (JP) ................. 2007-224324

(51) Int. Cl.
*H04M 1/66* (2006.01)
(52) U.S. Cl. ..................... 455/410
(58) Field of Classification Search .......... None
See application file for complete search history.

(56) References Cited

U.S. PATENT DOCUMENTS

| 2002/0196764 | A1 | 12/2002 | Shimizu |
| 2004/0103282 | A1* | 5/2004 | Meier et al. ................. 713/171 |
| 2006/0083200 | A1 | 4/2006 | Emeott et al. |
| 2006/0191000 | A1 | 8/2006 | O'Hara, Jr. et al. |
| 2006/0285519 | A1* | 12/2006 | Narayanan et al. .......... 370/331 |
| 2007/0288997 | A1* | 12/2007 | Meier et al. ........................ 726/4 |
| 2008/0070577 | A1* | 3/2008 | Narayanan et al. .......... 455/436 |

FOREIGN PATENT DOCUMENTS

| EP | 1322091 A1 | 6/2003 |
| EP | 1422875 A2 | 5/2004 |
| EP | 1439667 A2 | 7/2004 |
| JP | 20035641 A | 1/2003 |
| JP | 2003198557 A | 7/2003 |
| JP | 2004222300 A | 8/2004 |
| WO | 01/24560 A1 | 4/2001 |
| WO | 2004/095863 A1 | 11/2004 |
| WO | 2005/109771 A1 | 11/2005 |

OTHER PUBLICATIONS

Web article http://www.airspace.com/technology/technote_auth_enc_wlan.php.
Web article http://www.microsoft.com/japan/windonwsserver2003/techinfo/planning/walkthroughs/wirelesssystem.mspx.
Web article http://support.microsoft.com/?id=893357.
Web article http://www.ieee802.or/11/Tutorial/MAC.pdr.
Web article http://www.microsoft.com/technet/community/columns/cableguy/cg0505.mspx.

(Continued)

*Primary Examiner* — Anh-Vu Ly
(74) *Attorney, Agent, or Firm* — Fujitsu Patent Center

(57) ABSTRACT

A key management device for communicating with relay devices is provided, and one of the relay devices, which is communicating with a communication device based on master key information, transmits the master key information to the key management device. If the communication with the communication device has been enabled, the other relay devices makes a request to the key management device for transmission of the master key information. Then, the key management device transmits the master key information, which has been received from the one of the relay devices, to the other relay device, and then the other relay device can communicates with the communication device using the received master key information.

11 Claims, 17 Drawing Sheets

OTHER PUBLICATIONS

European Search Report dated Oct. 22, 2009, issued in corresponding European Patent Application No. 07119620.8.
Sankar, Krishna et al.; "Cisco Wireless Lan Security" Cisco Press, Nov. 15, 2004, XP002548169, ISBN: 978-1-58705-154-8, Chapter 9. SWAN: End-to-End Security Deployment. (Cited in ESR).

Prasad, A. R. et al.; "Roaming Key based Fast Handover in WLANs"; Wireless Communications and Networking Conference, 2005 IEEE New Orleans, LA, USA, Mar. 13-17, 2005, Piscataway, NJ, USA, IEEE, vol. 3, Mar. 13, 2005, pp. 1570-1576, XP010791410, ISBN: 978-0-7803-8966-3 the whole document. (Cited in ESR).

* cited by examiner

FIG. 3

| COMMUNICATION DEVICE IDENTIFICATION INFORMATION (MAC ADDRESS) | KEY IDENTIFICATION INFORMATION (PMKID) | MASTER KEY INFORMATION (PMK) | COMMUNICATION KEY |
|---|---|---|---|
| 00:0a:0e:00:2a:3b:1a:3b | 30ab2b44afeb | 02fa3dfa6afa32ff19ab553e | 13d4f56e… |
| 00:0a:0e:00:25:23:33:33 | 20bc3671f3de | 3ba3befec2fa5d24acef027f | edffbcc3… |
| … | … | … | … |

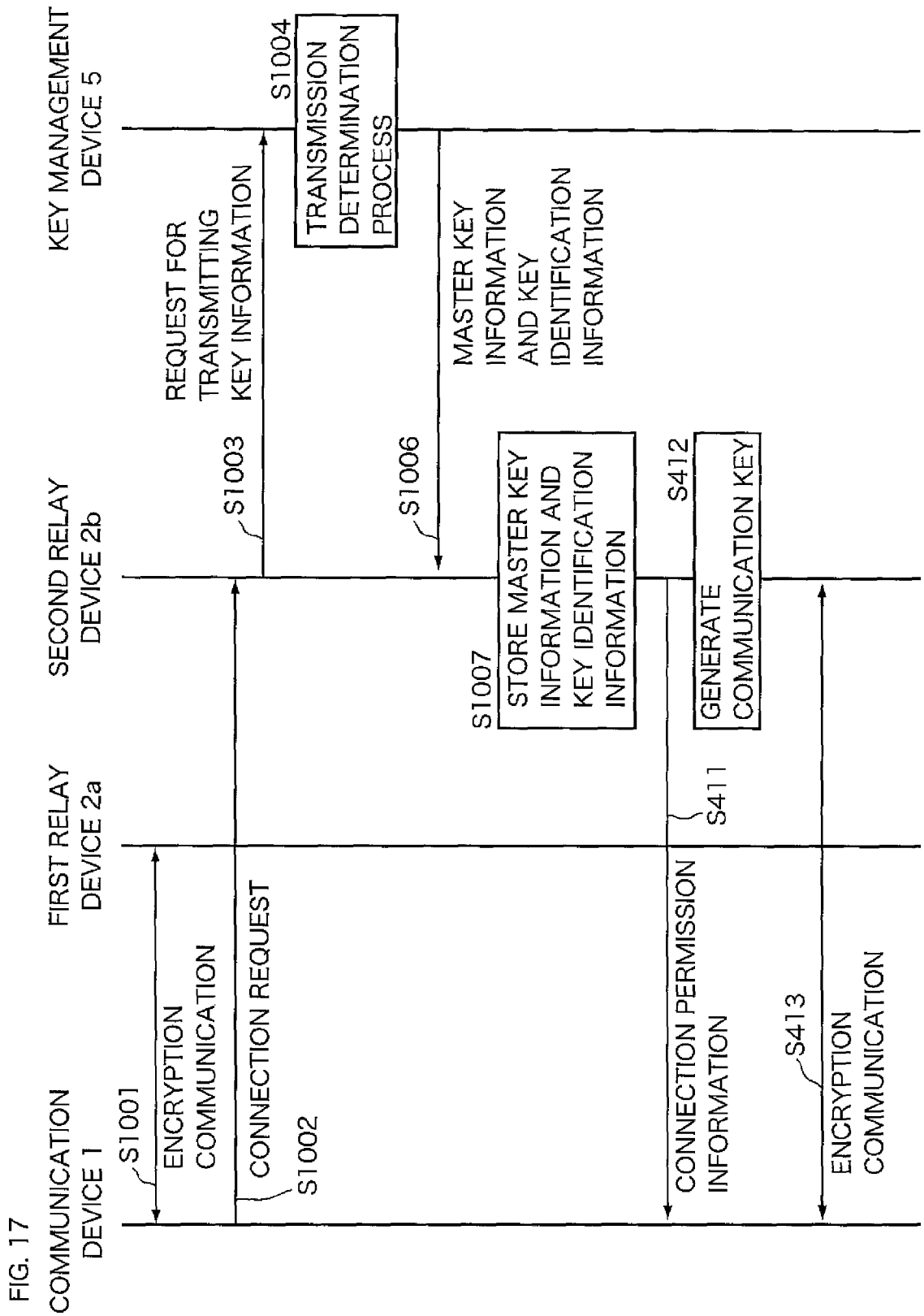

COMMUNICATION METHOD, COMMUNICATION SYSTEM, KEY MANAGEMENT DEVICE, RELAY DEVICE AND RECORDING MEDIUM

CROSS-REFERENCE TO RELATED APPLICATIONS

This Non-provisional application claims priority under 35 U.S.C. §119(a) on Patent Application No. 2006-294662 and No. 2007-224324 filed in Japan on Oct. 30, 2006 and Aug. 30, 2007 respectively the entire contents of which are hereby incorporated by reference.

BACKGROUND

1. Technical Field

The present invention relates to: a communication method for establishing communication between a portable communication device and a plurality of relay devices capable of communicating with the communication device; a communication system to which the communication method is applied; a key management device and a relay device which are used in the communication system; and a computer program for implementing the key management device and the relay device. In particular, the present invention relates to a communication method, a communication system, a key management device, a relay device and a recording medium, which are used to establish communication between a communication device and the relay device based on key information required for concealment of the communication.

2. Description of the Related Art

In recent years, the use of wireless LAN has been rapidly spread in general households and companies, and portable IP phones utilizing wireless LAN has also been attracting attention. A communication device, used as a portable IP phone, and a relay device, known as an access point for communicating with the communication device, share master key information. The master key information is called a "PMK (Pairwise Master Key)" and is required for concealment of the communication in a wireless zone. The communication device and the relay device encrypt and decrypt the communication content by using a communication key derived from the shared master key information, thereby realizing wireless communication with high security.

The master key information used for concealment of communication, can be shared between a communication device and a relay device as follows. Based on a mutual authentication standard such as EAP-TLS provided by WPA2 (Wi-Fi Protected Access) which is an encryption standard for wireless LAN, the communication device and the relay device make a request to an authentication device for authentication, and the authentication device transmits encrypted master key information to the authenticated communication device and relay device, thereby allowing the master key information to be shared between the communication device and the relay device. A method for performing wireless communication in such a manner is provided by a standard such as IEEE802.1X, for example.

Further, a user who possesses a communication device may move during communication such as a phone call using the communication device, and this move of the communication device may require a process for switching a relay device to which the communication device makes access. In such a case, the communication device has to share master key information with the relay device that has been switched. The sharing process of the master key information might take about 1.5 seconds, which becomes a cause of a communication trouble such as a phone call interruption. It should be noted that, although a process of deriving communication key from the master key information only takes about a few milliseconds, and therefore, no particular problem occurs even during a phone call.

As an example of methods for speeding up a process switching a relay device to the other, called a "PMK cache method". In the PMK cache method, master key information shared with a communication device is stored by both the relay device and communication device, even after the communication link was disconnected. In this method, if the communication device returned the area where it can communicate with the previously connected relay devices, and when the master key information used for the previous communication are still valid, the stored master key information is used, thereby avoiding a process for sharing the master key information.

Another example of such methods is a method called "preauthentication method". In the preauthentication method, a communication device communicating with one of relay devices, shares master key information with the each adjacent relay devices via wired communication links between the relay devices in advance, and if the communication device is allowed to communicate with the other relay device, the other relay device uses the already shared master key information, thereby speeding up the switching process.

Furthermore, an example of methods for avoiding a process for sharing master key information based on the result of authentication include the method disclosed in Japanese Unexamined Patent Application Publication No. 2004-222300. The method, disclosed in Japanese Unexamined Patent Application Publication No. 2004-222300, derives RKs (Roaming Keys) from master key information (PMK) for each adjacent relay devices for a terminal device which is successfully authenticated by the first relay device, and the first relay device distributes the generated R's to the adjacent other relay device. Thus, in this method, if a communication device communicating with one of relay devices is allowed to communicate with the other relay device, the other relay device uses the distributed RK as the equivalent of the PMK for that relay device, thereby avoiding a process for sharing master key information.

However, the PMK cache method has a problem that it is effective only in the case of reconnecting to a previously connected relay device, and cannot be applied to a newly connecting relay device.

Furthermore, in the preauthentication method, a communication device during communication carries out a process for sharing master key information with all the other adjacent relay devices via the first connected relay device, and therefore, there arises a problem that the processing load on the communication device during communication is increased. If the processing load on the communication device is increased, a process for reproducing media communication data cannot be completed in real time, and therefore, the following situations occur. For example, during a phone call, a trouble such as a clipping noise occurs, and in the case of visual communication, a trouble such as a block noise occurs. In addition, since a communication device performs a process for sharing master key information also with a relay device with which no communication is actually established, there arises a problem that the storage area of each relay device is constrained. Moreover, the unnecessary sharing of master key information with relay devices, which is not willing to communicate, might also lead to a problem that the security is weakened.

In the method disclosed in Japanese Unexamined Patent Application Publication No. 2004-222300, master key information is also transmitted to relay devices which is not willing to communicate, thus causing problems that the storage area of each relay device is constrained and the security is also weakened.

SUMMARY

The present application has been made in view of the above-described circumstances, and an object of the present invention is to provide a communication method, a communication system to which the communication method is applied, a key management device and relay devices which are used in the communication system, as well as a recording medium storing thereon a computer program for implementing the key management device and relay device. Specifically, in the present application, a key management device for transmitting/receiving master key information to/from relay devices is provided, one of the relay devices communicating with a communication device using the master key information, transmits the master key information to the key management device, and if a communication between the communication device and the newly connecting relay device become possible, the newly connecting relay device makes a request the key management device to transmit the master key information required for the communication with the communication device. Then, the key management device transmits the requested master key information, which is received from the first connected relay device on request, to the newly connecting relay device, thereby making it possible to avoid a process for sharing the master key information with a newly connecting relay device, to keep a storage area of each relay device from being constrained, to prevent an undue reduction in the security, and to prevent an increase in the processing load on each relay devices.

A communication method according to the present application establishes, based on key information required for concealment of communication, communication between a portable communication device and a plurality of relay devices capable of communicating with the communication device. The method is characterized in that: a key management device for transmitting/receiving key information to/from the relay devices is used; one of the relay devices, which is communicating with the communication device using the key information transmits the key information to the key management device; if communication between the communication device and the other relay device has become possible, the relay device requests the key management device to transmit the key information required for the communication with the communication device; the key management device transmits the key information, which has been received from the one of the relay devices, to the other relay device; and the other relay device further communicates with the communication device based on the requested and received key information.

In the present application, the key management device transmits the key information, which has been received from the one of the relay devices, to the other relay device, thereby making it possible to avoid a process for sharing the key information based on authentication also with the relay device which is the newly connecting communication device, and to speed up a process for switching communication with the one relay device to the other. Further, the key information is transmitted only to the relay device which actually becomes possible to communicate with the communication device. Thus, it is unnecessary to store the key information for a large number of the relay devices, which is not serving as an access destination, thereby keeping a storage area of each relay device from being constrained, and making it possible to prevent an undue reduction in the security.

A communication system according to the present application includes: a portable communication device; and a plurality of relay devices capable of communicating with the communication device, and establishes communication between the communication device and the relay devices based on key information required for concealment of the communication. The system is characterized in that: the system further includes a key management device for transmitting/receiving key information to/from the relay devices; one of the relay devices, which is communicating with the communication device using the key information, includes a communication section for transmitting the key information to the key management device; the other of the relay devices includes a request section for making a request to the key management device for transmission of the key information required for the communication with the communication device when the communication become possible; the key management device includes a communication section for transmitting the key information, which has been received from the one of the relay devices, to the other of the relay devices; and the other relay device further communicates with the communication device using the received key information from the key management device.

In the present application, the key management device transmits the key information, which has been received from the one of the relay devices, to the other relay devices, thereby making it possible to avoid a process for sharing the key information based on authentication between the newly connecting relay device and the communication device. And it speeds up the switching process of the communication device from one relay device to the other. Further, the key information is transmitted only to the relay devices which is connecting with the communication device. Thus, it is unnecessary for a large number of the relay devices, each not serving as an access destination, to store the key information, thereby keeping a storage area of each relay device from being constrained, and making it possible to prevent an undue reduction in the security.

The communication system according to the present application is characterized in that: the one of the relay devices further includes a communication section for transmitting key identification information for identifying the master key information which is currently used for the communication with the communication device, to the key management device; the key management device further includes a storage section for storing the received the key identification information, and a request section for making, in response to the request for the transmission of the key information from the relay device, a request to the one of the relay devices for transmission of the key information identified by the stored key identification information; and the communication section included in the one of the relay devices is configured to transmit the key information if the transmission of the key information has been requested.

In the present application, the key management device stores the key identification information, and relays the key information identified by the stored key identification information if transmission of the key information is requested from the other key management device to which the communication device newly makes access to start communication. Thus, the key management device stores key identification information whose data length is shorter than the key information, thereby making it possible to efficiently utilize the storage area; furthermore, a process for transmitting the key information will not be carried out during communication of the communication device, and therefore, the processing load on the communication device during communication will not be increased. Accordingly, it is possible to prevent the occurrence of troubles such as a clipping noise during a phone call, and a block noise during a visual communication.

The communication system according to the present application is characterized in that: the communication section included in the one of the relay devices is configured to transmit the key information without any request for transmission of the key information; the key management device further includes a storage section for storing the received key information; and the communication section is configured to transmit the stored key information in response to a request for transmission of the key information from the relay device.

In the present application, the key management device stores the key information, and transmits the stored key information if transmission of the key information is requested when the communication device starts communication with the newly connecting relay device, thus making it possible to rapidly carry out the transmission of the key information, and to speed up a process for switching one relay device to the other.

The communication system according to the present application is characterized in that: the communication device has a function of making a phone call; the key management device further includes a determination section for determining whether or not the communication device is making a phone call via the one of the relay devices; and if it is determined as "not busy", transmission of the key information is rejected.

In the present application, the key information is transmitted when a phone call is being made, and the transmission of the key information is rejected except when a phone call is being made during which communication interruption does not become a problem although a sound interruption during a phone call due to communication interruption is prevented, thus preventing the reutilization of the key information and enabling an improvement in the security.

The communication system according to the present application is characterized in that: the system further includes an authentication device for carrying out authentication concerning the communication with the communication device and the relay devices; the authentication device includes a communication section for transmitting the key information to the authenticated communication device and relay devices; and the relay devices each further include a request section for making, if the key management device does not transmit the key information, a request to the authentication device for authentication.

In situations where the above-described high-speed switching process is not applied, such as a situation where the communication device communicates with the relay device for the first time and a situation where the application of the above-mentioned switching process is inappropriate or prohibited, the present application can realize communication with high security based on a mutual authentication standard such as EAP-TLS provided by WPA2, for example.

A key management device according to the present application includes a communication section for transmitting/receiving, if communication is established between a portable communication device and a plurality of relay devices capable of communicating with the communication device based on key information required for concealment of the communication, the key information to/from the communication device and the relay devices. The key management device is characterized in that: the key information transmitted from one of the relay devices, which is communicating with the communication device based on the key information, is received; a request for transmission of the key information required for the communication with the communication device is accepted from the other of the relay devices whose communication with the communication device has been enabled; and the key information, which has been received from the one of the relay devices, is transmitted to the other of the relay devices in response to the accepted request.

In the present application, the key information, which has been received from the one of the relay devices, is transmitted to the other of the relay devices, thereby making it possible to avoid a process for sharing the key information based on authentication also with the relay device to which the communication device is newly connected, and to speed up a process for switching the relay device to which the communication device makes access. Further, the key information is transmitted only to the other of the relay devices whose communication with the communication device has been enabled. Thus, since it is unnecessary for a large number of the relay devices, each not serving as an access destination, to store the key information, a storage area of each relay device is kept from being constrained; furthermore, it is possible to avoid the sharing of the master key information between an excessive number of the devices, and therefore, it is possible to prevent a reduction in the security.

A relay device according to the present application is capable of communicating with a communication device based on key information required for concealment of the communication. The relay device is characterized in that: the relay device includes a communication section for communicating with a key management device for relaying the key information; the key information, which is used for the communication with the communication device, is transmitted to the key management device; if communication with the communication device with which no communication is established has been enabled, a transmission request is transmitted to the key management device for transmission of the key information required for the communication with the communication device; the key information transmitted from the key management device in response to the request is received; and communication with the communication device is established based on the received key information.

The present application utilizes the key information, which has been used by the communication device for the communication with the other of the relay devices; thus, even if a new connection is made to the communication device, it is possible to avoid a process for sharing the key information based on authentication, and to speed up the switching process with the communication device. Further, since the key information is requested only in the case where the communication with the communication device has been enabled, there is no need to store the key information if no relay device serves as an access destination. Therefore, a storage area of each relay device is kept from being constrained, and furthermore, it is possible to prevent an undue reduction in the security.

A recording medium according to the present application stores thereon a computer program for allowing a computer, which communicates with a communication device and a plurality of relay devices capable of communicating with the communication device, to transmit/receive key information required for concealment of communication between the communication device and relay devices to/from the communication device and relay devices. The recording medium is characterized in that the stored computer program allows the computer to execute: a step of storing key information transmitted from one of the relay devices communicating with the communication device based on the key information; and a step of transmitting the key information received from the one of the relay devices to the other of the relay devices if a request for transmission of the key information required for the communication with the communication device is accepted from the other of the relay devices whose communication with the communication device has been enabled.

In the present application, since the above steps are executed by a computer such as a server computer for communicating with the relay device used as an access point, the computer is activated as a key management device, and the key information received from one of the relay devices is transmitted to the other of the relay devices, thereby making it possible to avoid a process for sharing the key information also with the relay device to which the communication device is newly connected, and to speed up a process for switching the relay device to which the communication device makes access. Further, the key information is transmitted only to the other of the relay devices whose communication with the communication device has been enabled. Thus, it is unnecessary for a large number of the relay devices, each not serving as an access destination, to store the key information, thereby keeping a storage area of each relay device from being constrained; furthermore, it is possible to prevent a reduction in the security because the risk of storing the key information by an excessive number of the relay devices can be avoided.

A recording medium according to the present application stores thereon a computer program executed by a computer capable of communicating with a communication device based on key information required for concealment of the communication. The recording medium is characterized in that the stored computer program allows the computer to execute: a step of transmitting the key information, used for the communication with the communication device, to a predetermined device; a step of making, if communication with the communication device with which no communication is established has been enabled, a request to the predetermined device for transmission of the key information required for the communication with the communication device; and a step of establishing, when the key information in response to the request has been received, communication with the communication device based on the received key information.

In the present application, since the above steps are executed by a computer such as an access point that is connected to a wireless network to communicate with the communication device, the computer is activated as a relay device, and the key information, which has been used by the communication device for the communication with the other relay device, is utilized, thereby making it possible to avoid a process for sharing the key information based on authentication even if a new connection is made to the communication device, and to speed up the switching process with the communication device. Further, since the key information is requested only in the case where the communication with the communication device has been enabled, there is no need to store the key information if no relay device serves as access destination. Therefore, a storage area of each relay device is kept from being constrained, and furthermore, it is possible to prevent an undue reduction in the security.

In a communication method, a communication system, a key management device, relay devices and a recording medium according to the present application, the key management device for communicating with the relay devices, each serving as an access point for the communication device such as a portable IP phone, is provided, and one of the relay devices communicating with the communication device based on master key information transmits the master key information to the key management device. If communication with the communication device has been enabled, the other of the relay devices makes a request to the key management device for transmission of the master key information required for the communication with the communication device. Then, the key management device transmits the master key information, which has been received from the one of the relay devices, to the other of the relay devices, and the other of the relay devices communicates with the communication device based on the received master key information.

In such an embodiment, the present application achieves outstanding effects as follows. For example, it is possible to avoid a process for sharing the master key information also with the relay device to which the communication device is newly connected, and to speed up a process for switching the relay device to which the communication device makes access. The present application further achieves outstanding effects as follows. For example, the master key information is transmitted only to the other of the relay devices whose communication with the communication device has been enabled; thus, it is unnecessary for a large number of the relay devices, each not serving as an access destination, to store the master key information, thereby keeping a storage area of each relay device from being constrained, and making it possible to prevent a reduction in the security.

Furthermore, the present application achieves outstanding effects as follows. For example, the key management device rejects the transmission of the master key information if it is determined that the communication device is not making a phone call via one of the relay devices. Thus, the master key information is transmitted when a phone call is being made, and the transmission of the master key information is rejected except when a phone call is being made during which communication interruption does not become a problem although a sound interruption during a phone call due to communication interruption is prevented, thereby preventing the reutilization of the master key information and enabling an improvement in the security.

Moreover, in the present application, one of the relay devices transmits key identification information for identifying the master key information concerning the communication device, with which communication is being established, to the key management device. Further, the key management device stores the received key identification information, and makes, in response to the request for the transmission of the master key information from the relay device, a request to the one of the relay devices for transmission of the master key information identified by the stored key identification information. Then, the one of the relay devices transmits the master key information if the transmission of the master key information has been requested.

In such an embodiment, the present application achieves outstanding effects as follows. For example, the key management device stores the key identification information, and relays the master key information identified by the stored key identification information if transmission of the master key information is requested from the other key management device to which the communication device newly makes access to start communication. Thus, the key management device stores the key identification information whose data length is shorter than the master key information, thereby making it possible to efficiently utilize the storage area. Furthermore, a process for sharing the master key information will not be carried out during communication of the communication device, and therefore, the processing load of the communication device during communication will not be increased. Accordingly, it is possible to prevent the occurrence of troubles such as a clipping noise during a phone call, and a block noise during a visual communication.

The above and further objects and features of the invention will more fully be apparent from the following detailed description with accompanying drawings.

BRIEF DESCRIPTION OF THE SEVERAL VIEWS OF THE DRAWINGS

FIG. 3 is a schematic diagram for conceptually illustrating an exemplary content stored in a communication key table included in the relay device used in the communication system according to Embodiment 1;

FIG. 17 is a sequence diagram for illustrating an exemplary switching process for the terminal device, the relay devices and the key management device, which are used in the communication system according to Embodiment 4.

DETAILED DESCRIPTION

Hereinafter, embodiments of the present invention will be described in detail with reference to the drawings.

Embodiment 1

Figure 1:
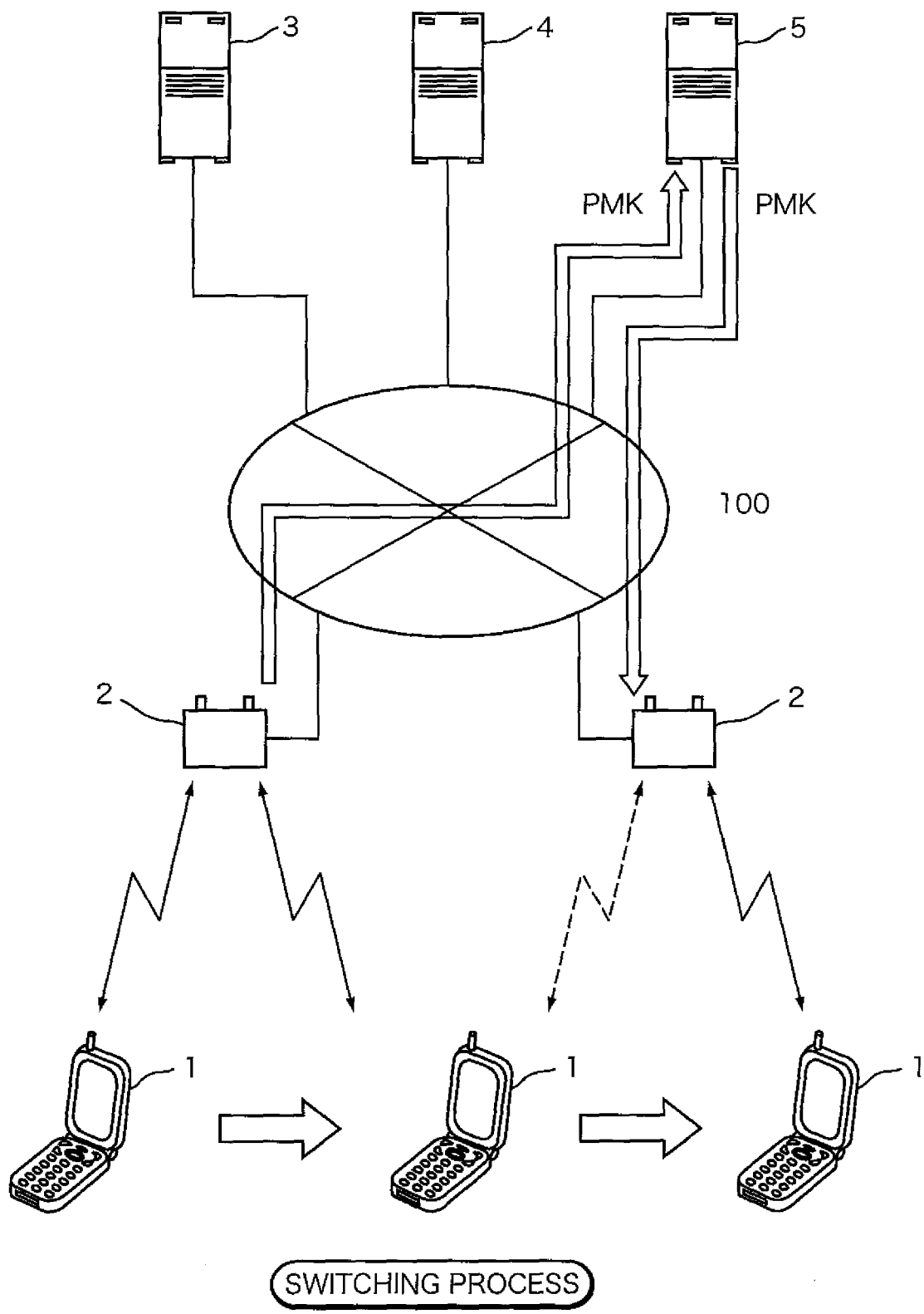
FIG. 1 is a schematic diagram for conceptually illustrating an exemplary configuration of a communication system according to Embodiment 1.

FIG. 1 is a schematic diagram for conceptually illustrating an exemplary configuration of a communication system according to Embodiment 1. In FIG. 1, the reference numeral 1 denotes a portable communication device such as a portable IP (Internet Protocol) phone, and the communication device 1 communicates with a plurality of relay devices 2, 2, . . . each serving as an access point for relaying wireless communication. The relay devices 2, 2, . . . are connected to each other via a communication network 100, and the communication network 100 is connected with: a call control device 3 such as an SIP server computer for controlling IP phone communication of the communication device 1 based on a communication protocol such as SIP (Session Initiation Protocol); and an authentication device 4 such as an authentication server computer for carrying out authentication concerning the communication between the communication device 1 and the relay device 2.

The communication network 100 is further connected with a key management device 6 according to the present embodiment using a computer such as a server computer for transmitting/receiving master key information, which is called a "PMK (Pairwise Master Key)" and required for concealment of the communication between the communication device 1 and the relay device 2, to/from the respective relay devices 2, 2, . . . .

These various kinds of devices are utilized in a communication system using wireless LAN. The communication device 1 communicates with one or a plurality of the relay devices 2, 2, . . . with which communication can be established, and selects the relay device 2 having the maximum electromagnetic wave intensity for the communication, for example, as the relay device 2 serving as an access destination. The communication device 1 and the relay device 2 selected as an access destination share master key information, which is binary data called a "PMK (Pairwise Master Key)" and required for the concealed communication, and utilize a communication key generated based on the shared master key information to encrypt and decrypt the communication content, thereby realizing wireless communication with high security.

It should be noted that, since a user who possesses the communication device 1 may move during communication such as a phone call using the communication device 1, the relay device 2 serving as an access destination for the communication device 1 is not fixed but changed in accordance with the situation such as the location of the communication device 1. Therefore, a switching process (i.e., a handover process) for switching the relay device 2 serving as an access destination is carried out.

Figure 2:
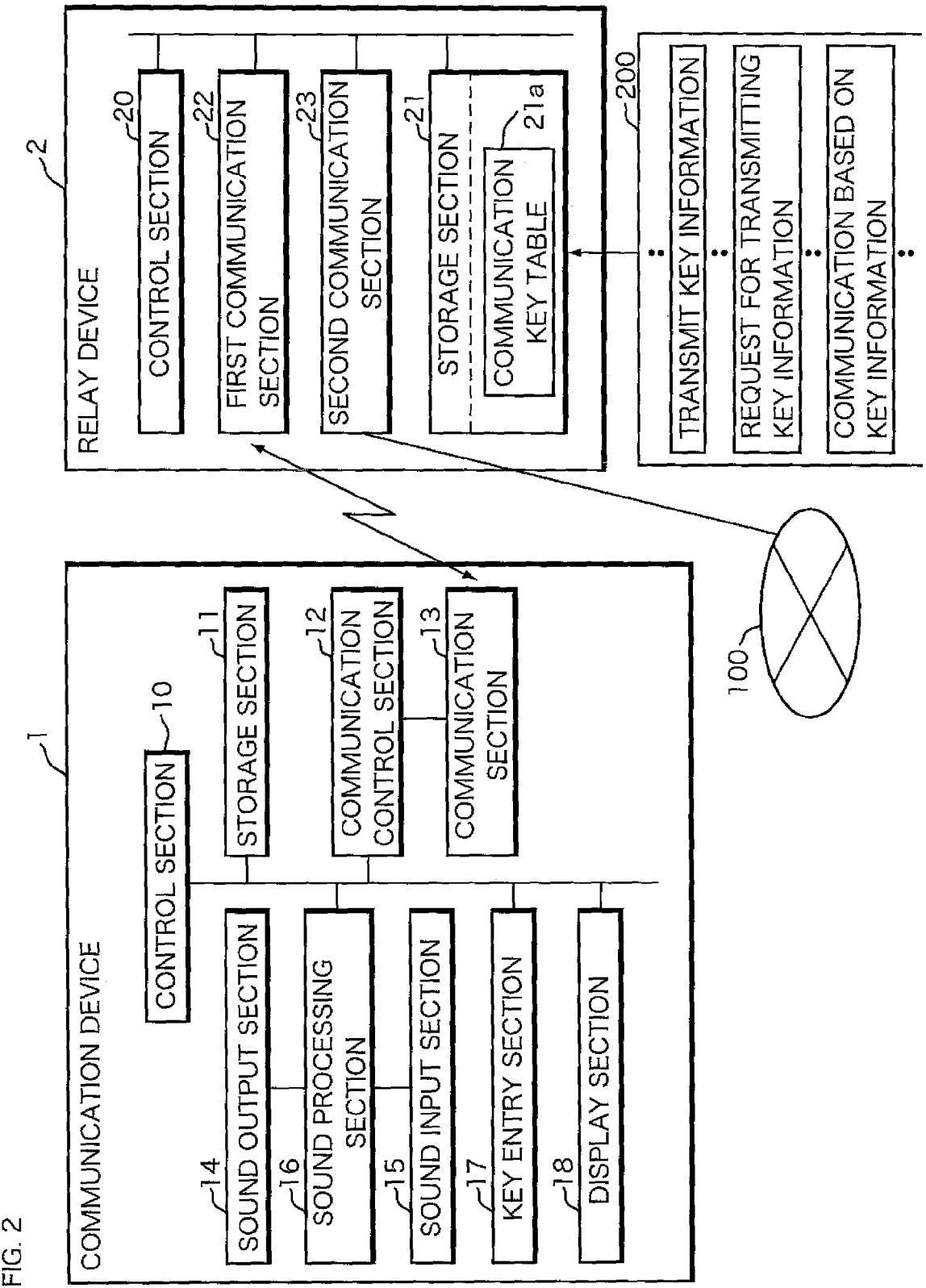
FIG. 2 is a block diagram for illustrating exemplary configurations of a communication device and a relay device, which are used in the communication system according to Embodiment 1.

Next, a configuration of each of various kinds of the devices used in the communication system according to the present embodiment will be described. FIG. 2 is a block diagram for illustrating exemplary configurations of the communication device 1 and the relay devices 2 (2a, 2b), which are used in the communication system according to Embodiment 1. The communication device 1 includes: a control section 10 such as a CPU for controlling the entire device; and a storage section 11 such as a ROM and/or a RAM for storing information such as a computer program and data necessary for various processes. Further, the control section 10 controls a communication control section 12 for controlling communication, and the communication control section 12 controls a communication section 13 consisting of: an antenna for transmitting/receiving data such as a digital signal necessary for a telephone communication; and a circuit or the like attached thereto. Furthermore, the control section 10 controls a sound processing section 16 for performing a conversion process for outputting an analog sound signal from a sound output section 14 such as a speaker, and a conversion process on an analog sound signal inputted from a sound input section 15 such as a microphone. Specifically, the conversion processes performed by the sound processing section 16 include a process for converting a digital signal to an analog sound signal so as to output the analog sound signal from the sound output section 14, and a process for converting an analog sound signal based on a sound inputted from the sound input section 15 to a digital signal. In addition, the communication device 1 includes: a key entry section 17 such as a push button that accepts a key entry including alphanumeric characters, various commands and the like; and a display section 18 such as a liquid crystal display for displaying various pieces of information such as key-entered information and information to be transmitted/received. Due to the control of the control section 10, the communication device 1 accepts an input from the key entry section 17, and allows the display section 18 to display necessary information.

The relay devices 2 (2a, 2b) each include a control section 20 such as a CPU for controlling the entire device; and a storage section 21 such as a hard disk, a ROM and/or a RAM for storing various pieces of information such as a computer program 200 and data for the relay devices according to the present embodiment. Further, due to the execution of the computer program 200, the computer, which is used as an access point, is activated as the relay device 2 according to the present embodiment. Furthermore, the relay devices 2 each include: a first communication section 22 for communicating with the communication device 1; and a second communication section 23 for making a connection to the communication network 100. It should be noted that a storage area of the storage section 21 included in each relay device 2 is partially utilized as a communication key table 21a in which information such as master key information required for the communication with the communication device 1 is stored.

FIG. 3 is a schematic diagram for conceptually illustrating an exemplary content stored in the communication key table 21a included in each relay device 2 used in the communication system according to Embodiment 1. In the communication key table 21a, various pieces of information are stored as records (entries) associated with each other. The various pieces of information stored in the communication key table 21a include: communication device identification information such as an MAC address for identifying the communication device 1; key identification information for identifying master key information (PMKID); master key information (PMK); and a communication key. Each of these records generated for each communication device 1 with which communication is established.

Figure 4:
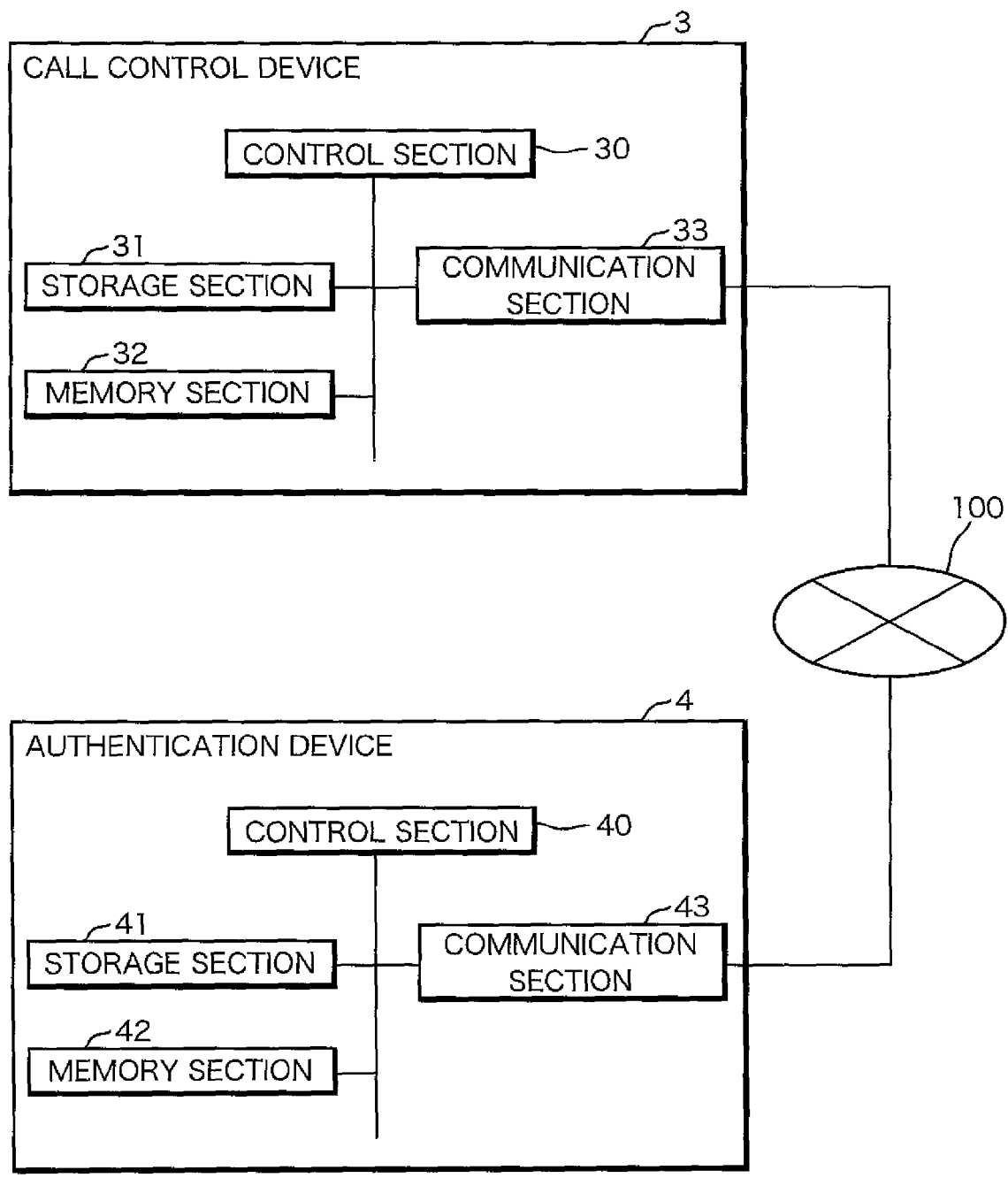
FIG. 4 is a block diagram for illustrating exemplary configurations of a call control device and an authentication device, which are used in the communication system according to Embodiment 1.

FIG. 4 is a block diagram for illustrating exemplary configurations of the call control device 3 and the authentication device 4, which are used in the communication system according to Embodiment 1. The call control device 3 includes: a control section 30; a storage section 31 such as a hard disk; a memory section 32 such as a RAM; and a communication section 33 for making a connection to the communication network 100. Based on a communication protocol such as SIP, the call control device 3 manages the status of the respective wireless communications between the communication device 1 and the relay devices 2, 2, . . . , which are to be managed, with the use of various identifiers concerning the communication.

The authentication device 4 includes: a control section 40; a storage section 41; a memory section 42; and a communication section 43, and executes an authentication process concerning the communication between the communication device 1 and the relay device 2 based on a mutual authentication standard such as EAP-TLS provided by WPA2 (Wi-Fi Protected Access) which is an encryption standard for wireless LAN.

Figure 5:
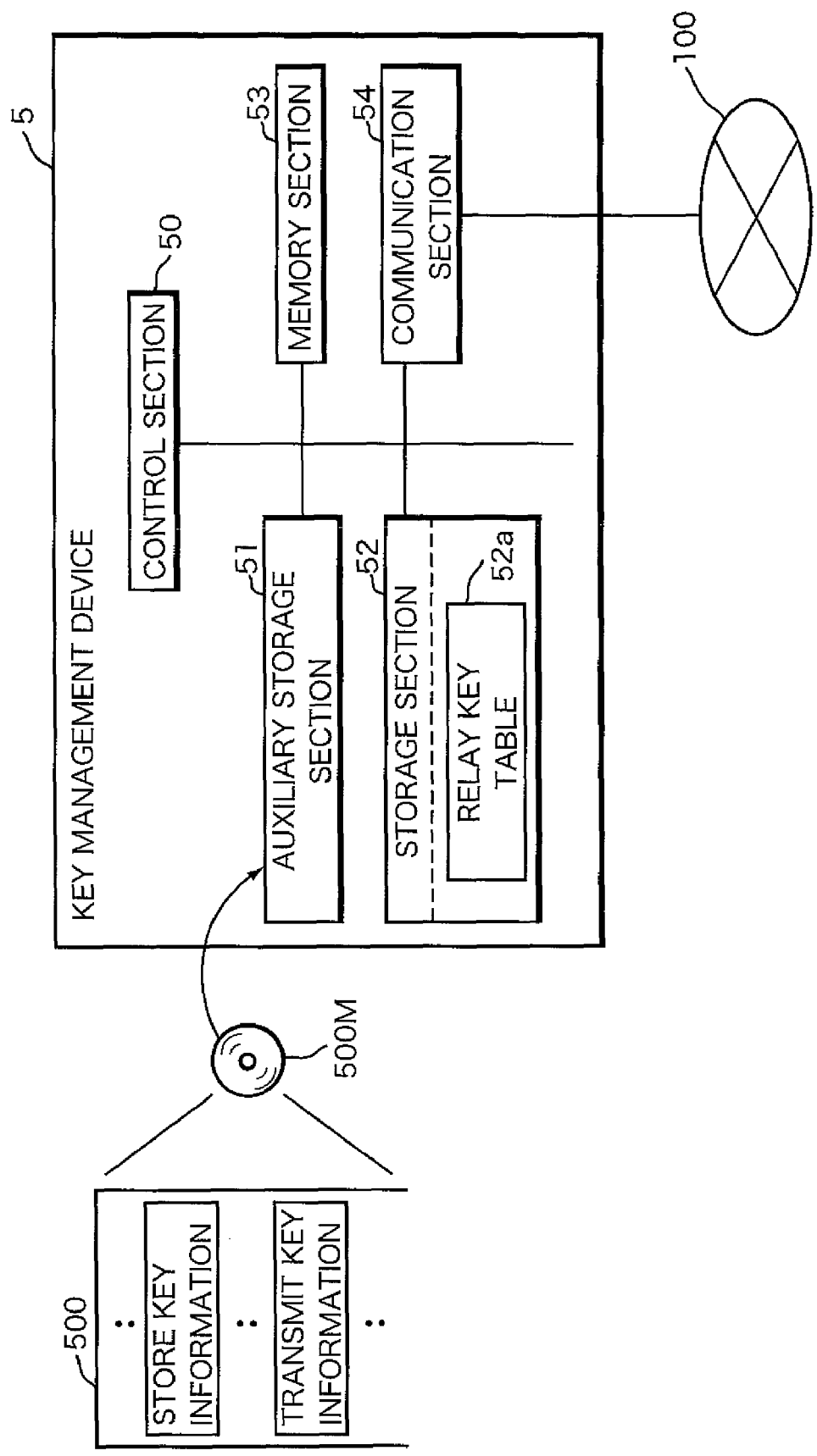
FIG. 5 is a block diagram for illustrating an exemplary configuration of a key management device used in the communication system according to Embodiment 1.

FIG. 5 is a block diagram for illustrating an exemplary configuration of the key management device 5 used in the communication system according to Embodiment 1. The key management device 5 includes: a control section 50 such as a CPU for controlling the entire device; an auxiliary storage section 51 such as a CD-ROM drive for reading various pieces of information from a recording medium 500M such as a CD-ROM on which various pieces of information, such as a computer program 500 and data for the key management device according to the present embodiment, are stored; a storage section 52 such as a hard disk for storing the various pieces of information read by the auxiliary storage section 51; and a memory section 53 such as a RAM for temporarily storing information. Further, the various pieces of information such as the computer program 500 and data are read from the storage section 52 so as to be stored in the memory section 53 such as a RAM for temporarily storing information, and the various procedures contained in the computer program 500 are executed by the control section 50, thereby allowing the server computer to be activated as the key management device 5 according to the present embodiment. The key management device 5 further includes a communication section 54 for making a connection to the communication network 100. It should be noted that a storage area of the storage section 52 included in the key management device 5 is partially utilized as a relay key table 52a for storing the information concerning the master key information to be transmitted/received to/from the relay devices 2, 2, . . . .

Figure 6:
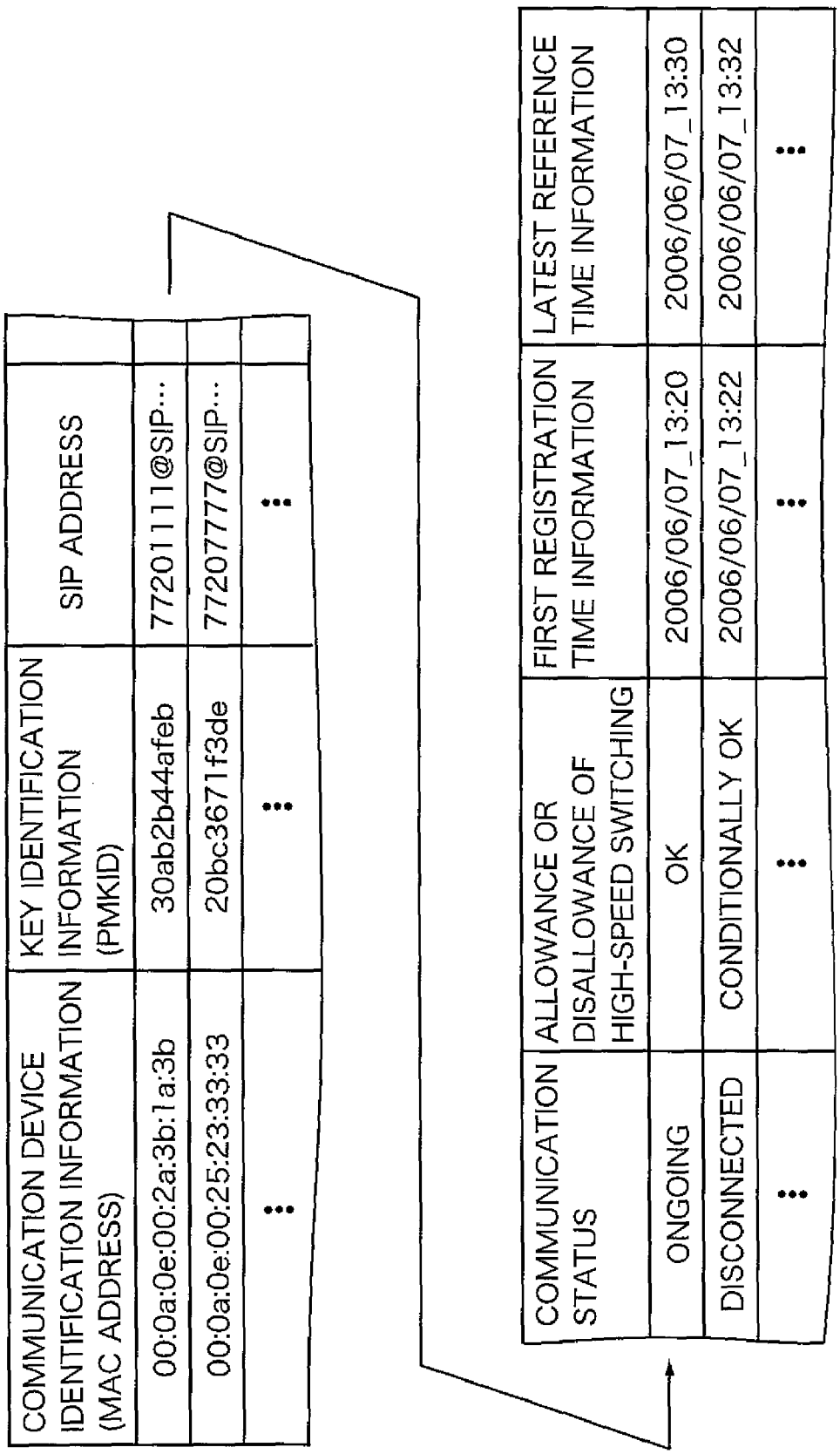
FIG. 6 is a schematic diagram for conceptually illustrating an exemplary content stored in a relay key table included in the key management device used in the communication system according to Embodiment 1.

FIG. 6 is a schematic diagram for conceptually illustrating an exemplary content stored in the relay key table 52a included in the key management device 5 used in the communication system according to Embodiment 1. In the relay key table 52a, various pieces of information are stored as records associated with each other. The various pieces of information stored in the relay key table 52a include: communication device identification information; key identification information; an SIP address; a communication status; an allowance or disallowance of high-speed switching; first registration time information; and the latest referenced time information. Each of these records is generated for each communication device 1 that is an object of management of communication. The SIP address refers to an address indicating a device that performs IP phone communication based on a communication protocol provided by the SIP. The communication status refers to information indicating whether or not the communication device 1 concerning the record is making a phone call via IP phone communication. If a phone call of the communication device 1 is connected as an IP phone, information "During Phone Call" indicating that a phone call is being made is stored, and if a phone call of the communication device 1 is not connected, information "Phone Call Disconnected" indicating that no phone call is being made is stored. Thus, the communication status is information whose stored content is changed in accordance with a communication status. The allowance or disallowance of high-speed switching refers to information indicating whether or not the communication device 1 is an object of application of the after-mentioned master key information switching process. Information "OK" is stored for the communication device 1 which allows a relay process for the master key information as the application object, while information "Failed" is stored for the communication device 1 that disallows the relay process. It should be noted that, for example, a condition such as a time limit may be provided, and information "Conditionally OK" may be stored as shown in FIG. 6. The first registration time information refers to information indicating a time when the record is stored in the relay key table 52a. The latest reference time information refers to information that indicates a time when the last reference has been made to the record, and that is updated each time reference is made to the record.

Figure 7:
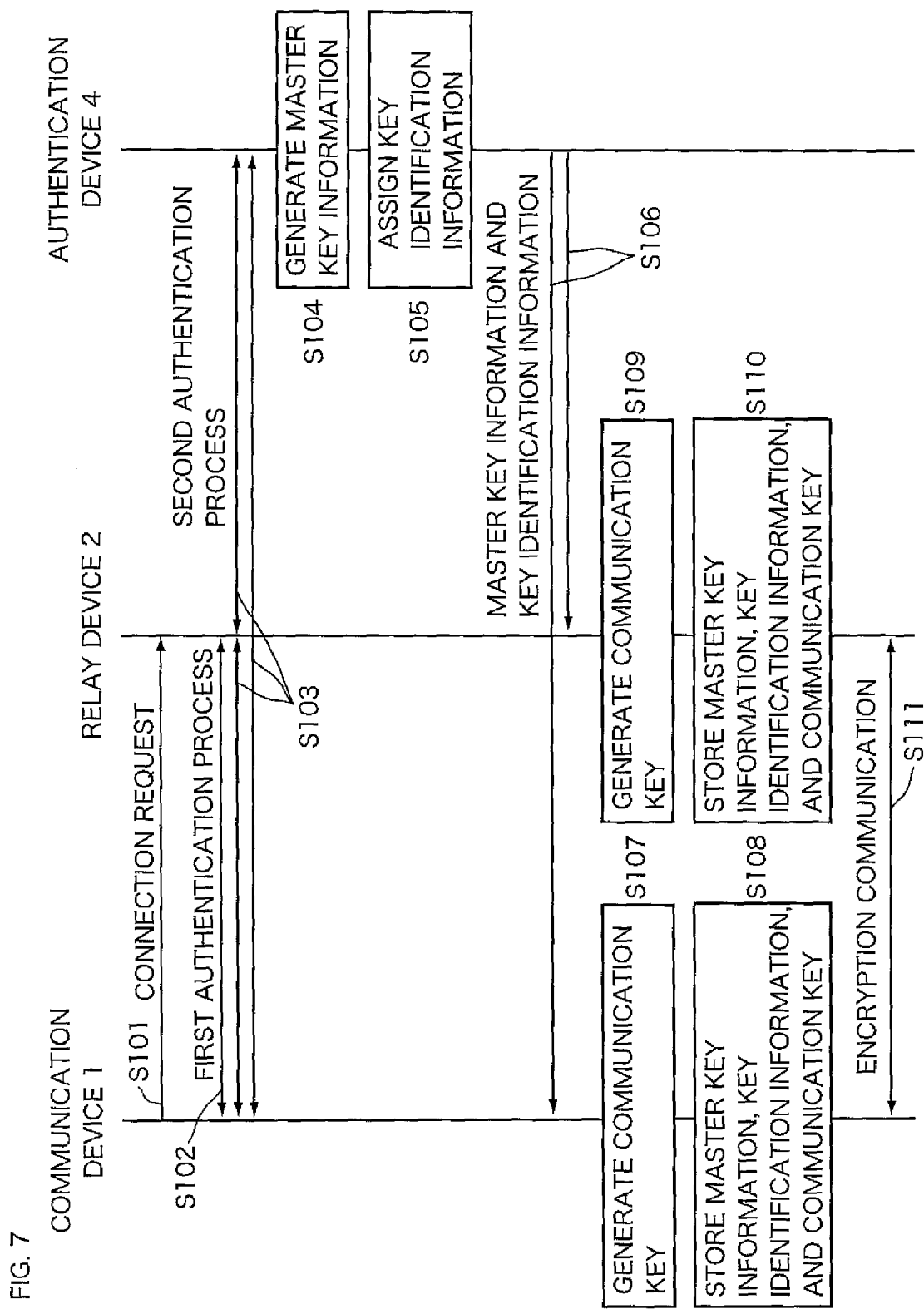
FIG. 7 is a sequence diagram for illustrating an exemplary communication starting process of the communication device, the relay device and the authentication device, which are used in the communication system according to Embodiment 1.

Next, the processes performed by the various kinds of the devices used in the communication system according to the present embodiment will be described. FIG. 7 is a sequence diagram for illustrating an exemplary communication starting process of the communication device 1, the relay device 2 and the authentication device 4, which are used in the communication system according to Embodiment 1. FIG. 7 illustrates the process carried out based on the standard provided by IEEE802.1X.

Due to the control of the control section 10, the communication device 1 selects the relay device 2 serving as an access destination, and then transmits a connection request for requesting a connection to the selected relay device 2 as the access destination (S101) from the communication section 13. The connection request in Step S101 indicates communication device identification information for identifying the communication device 1 from which the request has been transmitted.

Due to the control of the control section 20 for executing the computer program 200, the relay device 2 receives the connection request at the first communication section 22, and transmits/receives various pieces of information concerning authentication to/from the communication device 1, thereby executing a first authentication process (S102). The first authentication process in Step S102 is an authentication process called "open authentication" which is executed in order to realize backward compatibility prior to an authentication process provided by IEEE802.1X.

After the authentication by the first authentication process has been succeeded, various pieces of information concerning the authentication are transmitted/received to/from the communication device 1, the relay device 2 and the authentication device 4, thereby executing a second authentication process (S103). The second authentication process in Step S103 allows the execution of the authentication process among the communication device 1, the relay device 2 and the authentication device 4' provided by IEEE802.1X and including a RADIUS authentication process between the relay device 2 and the authentication device 4. Further, this authentication process is a process executed based on a mutual authentication standard such as EAP-TLS provided by WPA2 (Wi-Fi Protected Access), which is an encryption standard for wireless LAN.

Furthermore, due to the control of the control section 40, the authentication device 4 generates master key information required for concealment of the communication between the authenticated communication device 1 and relay device 2 (S104), assigns key identification information to the generated master key information (S105), and then transmits, from the communication section 43, the master key information and key identification information to the communication device 1 and relay device 2 between which communication is carried out (S106).

Due to the control of the control section 10, the communication device 1 receives, at the communication section 13, the master key information and key identification information to derive a communication key from the received master key information (S107), and stores the received master key information and key identification information as well as the generated communication key in the storage section 11 (S108).

Due to the control of the control section 20, the relay device 2 receives, at the first communication section 22, the master key information and key identification information to generate a communication key based on the received master key information (S109), and then stores the received master key information and key identification information as well as the generated communication key in the communication key table 21a of the storage section 21 so as to be associated with the communication device identification information for identifying the communication device 1 with which communication is to be established (S110). Thus, the process for sharing the master key information between the communication device 1 and the relay device 2 is carried out.

Further, the communication over wireless link, between the communication device 1 and the relay device 2 is started. This communication is concealed using the communication key to encrypt or to decrypt the original communication content (S111). Thus, the communication process is carried out.

Figure 8:
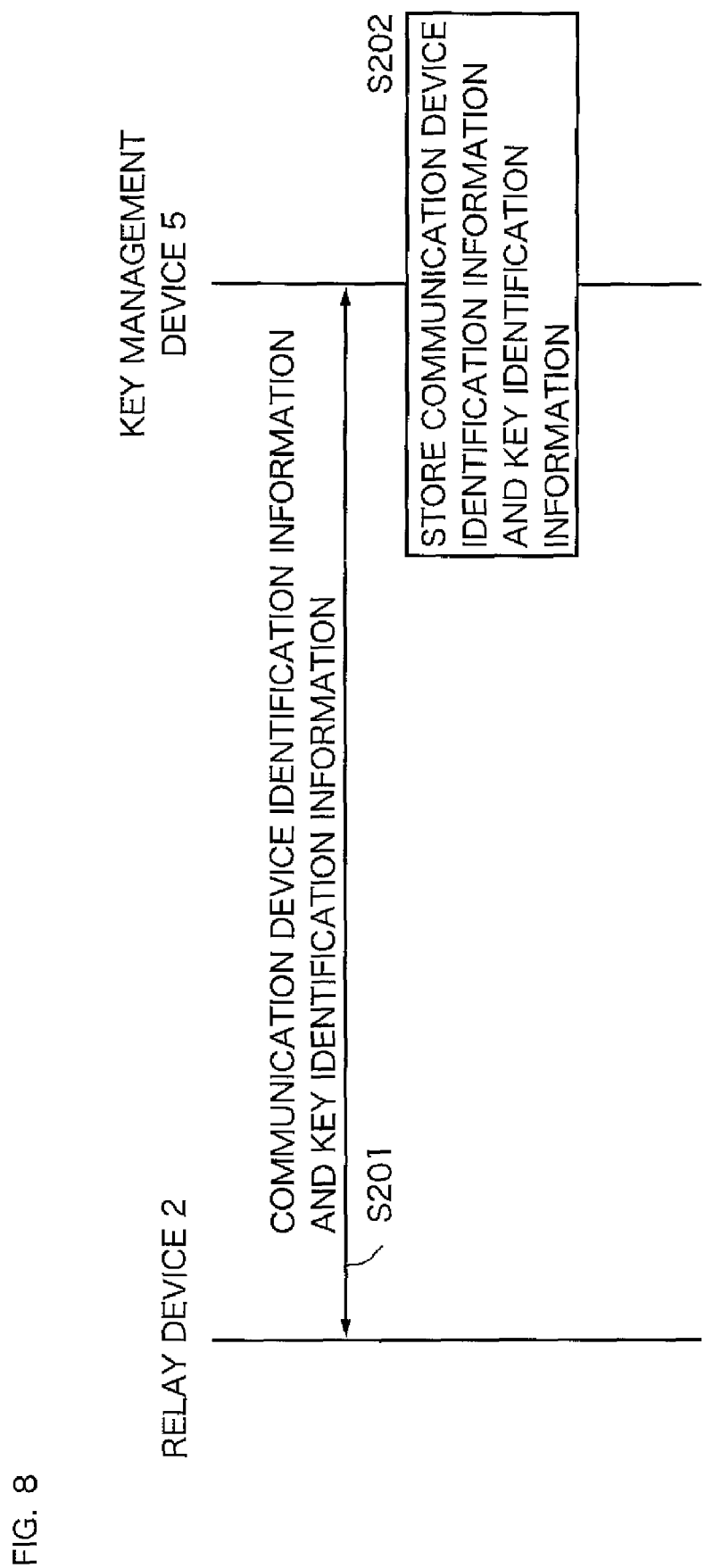
FIG. 8 is a sequence diagram for illustrating an exemplary key identification information storing process of the relay device and the key management device, which are used in the communication system according to Embodiment 1.

FIG. 8 is a sequence diagram for illustrating an exemplary key identification information storing process of the relay device 2 and the key management device 5, which are used in the communication system according to Embodiment 1. Due to the control of the control section 20 for executing the computer program 200, the relay device 2, which has received the master key information and key identification information from the authentication device 4, transmits the communication device identification information concerning the communication device 1, to which transmission is made, and the received key identification information to the key management device 5 from the second communication section 23 (S201).

Due to the control of the control section 50 for executing the computer program 500, the key management device 5 receives, at the communication section 54, the communication device identification information and key identification information, and then stores the received communication device identification information and key identification information in the relay key table 52a of the storage section 52 (S202). At the time of the storing in Step S202, the first registration time information indicating the stored time is also stored in the relay key table 52a. Thus, the key identification information storing process is carried out. It should be noted that the execution time of the key identification information storing process is not particularly limited after the relay device 2 has received the master key information and key identification information, whereas the key identification information storing process is preferably executed prior to the start of the encryption communication. This is because of reducing the processing load on the relay device 2 during the encryption communication.

Figure 9:
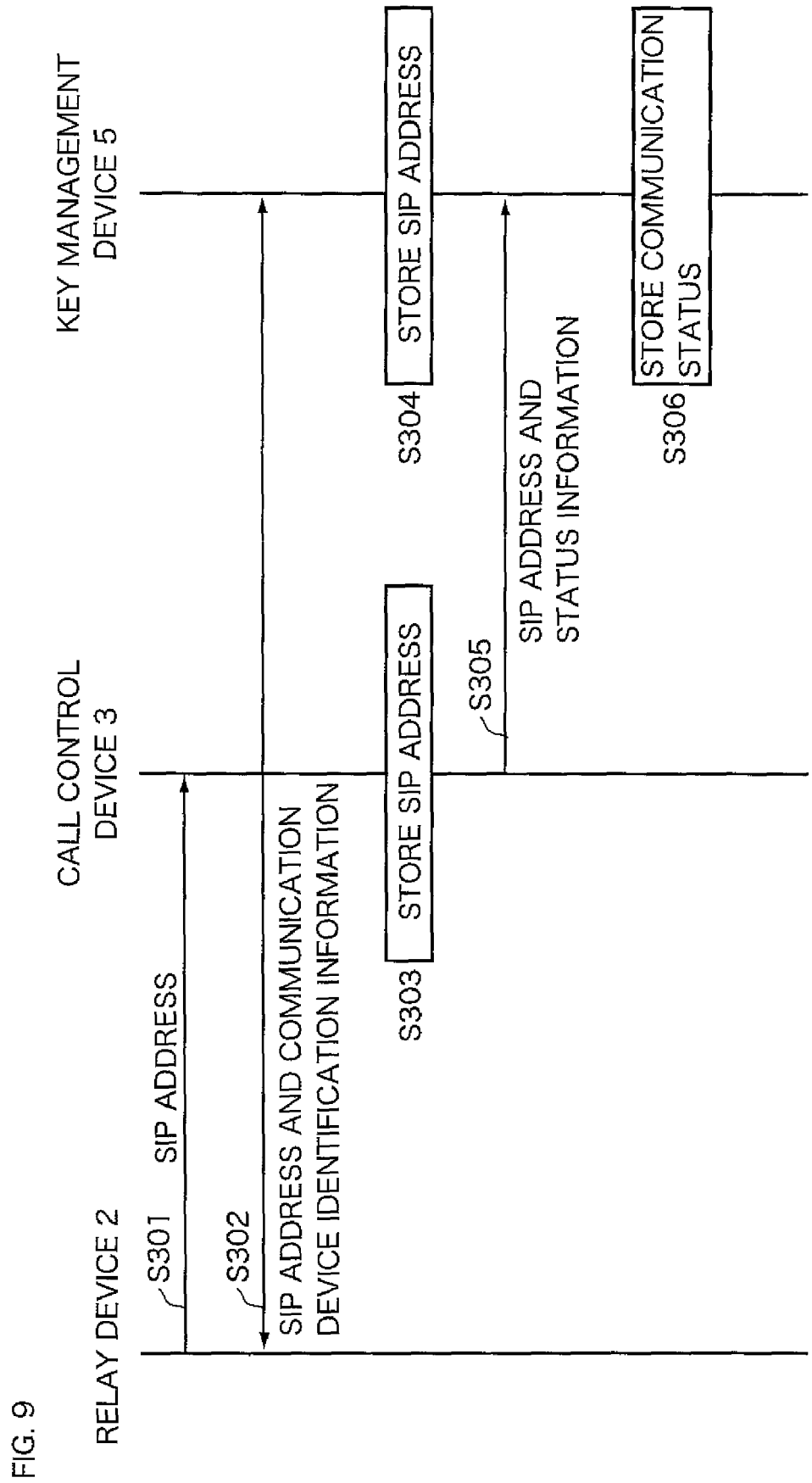
FIG. 9 is a sequence diagram for illustrating an exemplary call control-related process of the relay device, the call control device and the key management device, which are used in the communication system according to Embodiment 1.

FIG. 9 is a sequence diagram for illustrating an exemplary call control-related process of the relay device 2, the call control device 3 and the key management device 5, which are used in the communication system according to Embodiment 1. If the communication performed by the communication device 1 via the relay device 2 is IP phone communication, the communication to be executed is managed by the call control device 3. Due to the control of the control section 20 for executing the computer program 200, the relay device 2 transmits an SIP address of the communication device 1 concerning the IP phone communication to the call control device 3 from the second communication section 23 (S301), and further transmits the SIP address of the communication device 1 concerning the IP phone communication and the communication device identification information to the key management device 5 from the second communication section 23 (S302).

Due to the control of the control section 30, the call control device 3 receives the SIP address at the communication section 33, and stores the received SIP address as an entry serving as an object of call control (S303).

Due to the control of the control section 50 for executing the computer program 500, the key management device 5 receives, at the communication section 54, the SIP address and the communication device identification information, and then stores the received SIP address in the relay key table 52a of the storage section 52 (S304). It should be noted that a record serving as a storage destination can be determined by using the received communication device identification information as a search key.

Then, due to the control of the control section 30, upon start of the IP phone communication, the call control device 3 transmits the SIP address of the communication device 1 during communication and status information indicating communication status to the key management device 5 from the communication section 33 (S305).

Due to the control of the control section 50, the key management device 5 receives the SIP address and status information at the communication section 54, and then stores the communication status, indicated by the received status information, in the relay key table 52a of the storage section 52 (S306). It should be noted that a record serving as a storage destination can be determined by using the received SIP address as a search key. It should also be noted that the notification of the communication status illustrated as Steps S305 and S306 is executed each time a change occurs in the communication status. Thus, the call control-related process is carried out.

Figure 10:
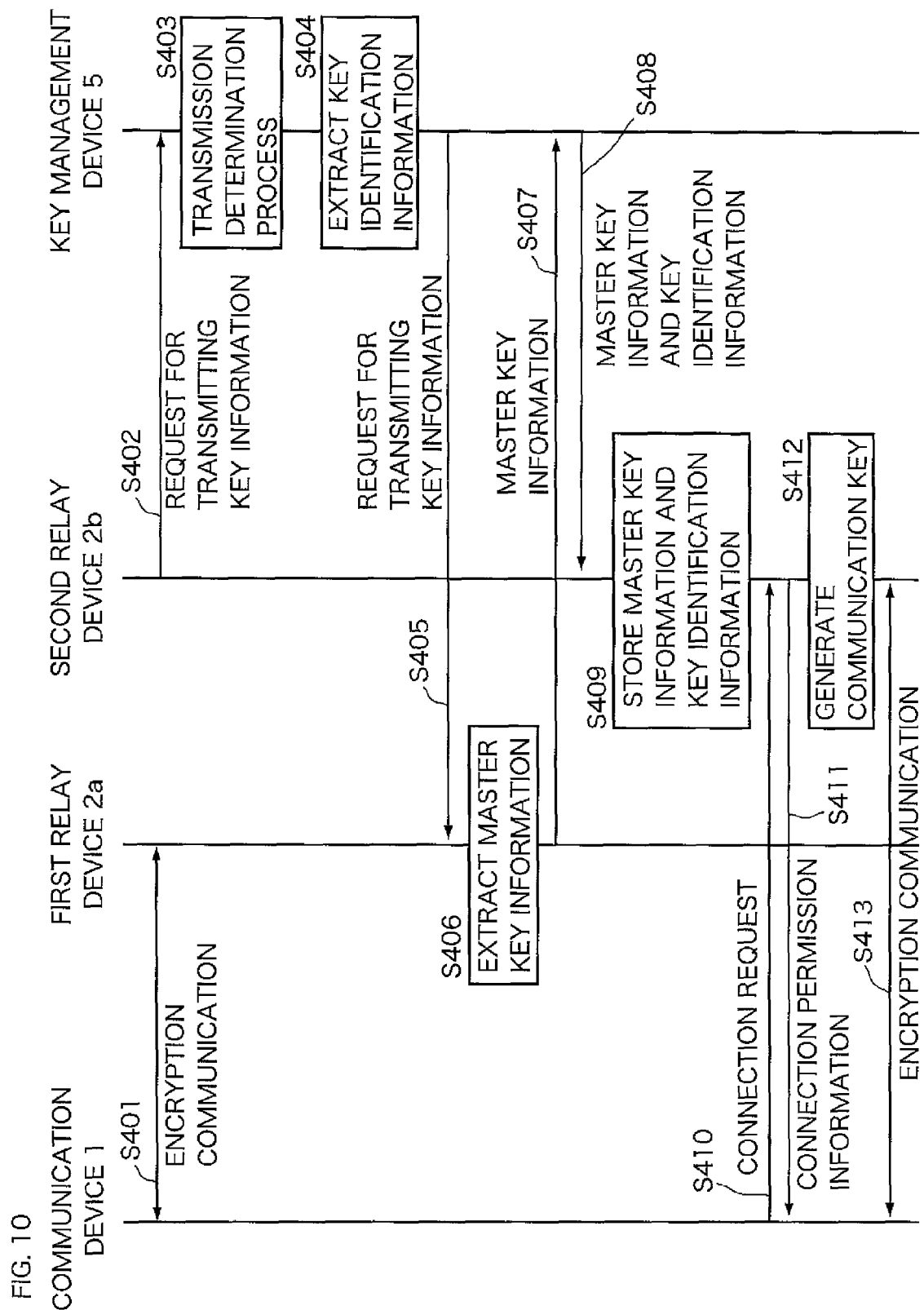
FIG. 10 is a sequence diagram for illustrating an exemplary switching process for a terminal device, the relay devices and the key management device, which are used in the communication system according to Embodiment 1.

Next, description will be made about various processes to be executed in the case where the communication device 1, which has started communication such as IP phone communication by the above-described respective processes, is moved to cause the need for switching of the relay device 2 serving as an access destination. FIG. 10 is a sequence diagram for illustrating an exemplary switching process for the communication device 1, the relay devices 2 and the key management device 5, which are used in the communication system according to Embodiment 1. It should be noted that, if it is necessary to make a distinction in particular between the relay device 2 before being switched and the relay device 2 serving as a switching destination, the following description will be made on the assumption that the former is defined as a first relay device 2a while the latter is defined as a second relay device 2b. Due to the above-described various processes, the communication device 1 and the first relay device 2a carry out encrypted communication concerning IP phone communication in which the communication in a wireless zone is encrypted (S401).

There is a case where the communication device 1 communicating with the first relay device 2a moves and enters a communication area of the second relay device 2b, and the communication with the second relay device 2b becomes possible. In that case, due to the control of the control section 20 for executing the computer program 200, the second relay device 2b transmits a key information transmission request for requesting transmission of the master key information, required for the communication with the communication device 1, to the key management device 5 from the second communication section 23 (S402). The key information transmission request, transmitted in Step S402, indicates the communication device identification information for identifying the communication device 1 with which communication has been enabled.

Due to the control of the control section 50 for executing the computer program 500, the key management device 5 receives the key information transmission request at the communication section 54, and then executes a transmission determination process for determining whether or not the transmission of master key information is permitted in response to the received key information transmission request (S403). The transmission determination process in Step S403 will be described in more detail later, and a process carried out in the case where the transmission of the master key information is determined to be permitted will be described below.

Due to the control of the control section 50, the key management device 5 extracts, from the relay key table 52a, the key identification information stored so as to be associated with the communication device identification information indicated on the key information transmission request (S404), and then transmits the key information transmission request for requesting the transmission of the master key information, identified by the extracted key identification information, to the first relay device 2a from the communication section 54 (S405). The key information transmission request, transmitted in Step S405, indicates the key identification information. It should be noted that the key management device 5 regards, as the first relay device 2a with which communication is being established, the relay device 2 from which the key identification information has been transmitted or the relay device 2 from which the master key information has been transmitted the last time in response to the request, and determines the first relay device 2a as a transmission destination for the key information transmission request. Alternatively, the key management device 5 may make a request to the communication device 1 via the second relay device 2b for the transmission of information indicating the first relay device 2a which is establishing the communication, and then the communication device 1 may transmit, in response to the request, the information to the key management device 5 via the second relay device 2b, thereby allowing the key management device 5 to determine the first relay device 2a. Optionally, the key management device 5 may transmit the key information transmission requests to a plurality of the relay devices 2, and then the relay device 2a, which stores the master key information concerning the key identification information indicated by the key information transmission request, may transmit the master key information to the key management device 5, thereby allowing the key management device 5 to determine the first relay device 2a.

Due to the control of the control section 20 for executing the computer program 200, the first relay device 2a receives the key identification information at the second communication section 23 to extract, from the communication key table 21a of the storage section 21, the master key information stored so as to be associated with the received key identification information (S406), and then transmits the extracted master key information to the key management device 5 from the second communication section 23 (S407).

Due to the control of the control section 50, the key management device 5 receives the master key information at the communication section 54, and then transmits the received master key information and stored key identification information to the second relay device 2b from the communication section 54 (S408).

Due to the control of the control section 50, the second relay device 2b receives the master key information and key identification information at the second communication section 23, and then stores the received master key information and key identification information in the communication key table 21a of the storage section 21 so as to be associated with the communication device identification information for identifying the communication device 1 with which communication has been enabled (S409).

Then, due to the control of the control section 10, the communication device 1 transmits a connection request for requesting a connection to an access destination to the second relay device 2b from the communication section 13 (S410). The connection request in Step S410 indicates the communication device identification information for identifying the communication device 1 from which the request is made, and the key identification information.

Due to the control of the control section 20, the second relay device 2b receives the connection request at the first communication section 22, and then checks the communication device identification information and key identification information, indicated on the received connection request, against the content stored in the communication key table 21a of the storage section 21. Thus, the second relay device 2b determines the validity of the connection request, and then transmits connection permission information for permitting the connection to the communication device 1 from the first communication section 22 (S411).

Due to the control of the control section 20, the second relay device 2b extracts, from the communication key table 21a of the storage section 21, the master key information stored so as to be associated with the key identification information indicated by the received connection request, and then generates a communication key based on the extracted master key information (S412).

Due to the control of the control section 10, the communication device 1 receives the connection permission information at the communication section 13, and then reutilizes, for the communication with the second relay device 2b, the master key information to derive the communication key, has been used for the communication with the first relay device 2a, thereby carrying out the sharing of the communication key.

Thereafter, in a wireless zone, one of the communication device 1 and the second relay device 2b transmits transmission information, which is generated by encrypting the communication content via the communication key, to the other device, and then the other device starts communication using encryption communication in which the received transmission information is decrypted via the communication key to generate the original communication content (S413). Thus, the switching process is carried out.

Figure 11:
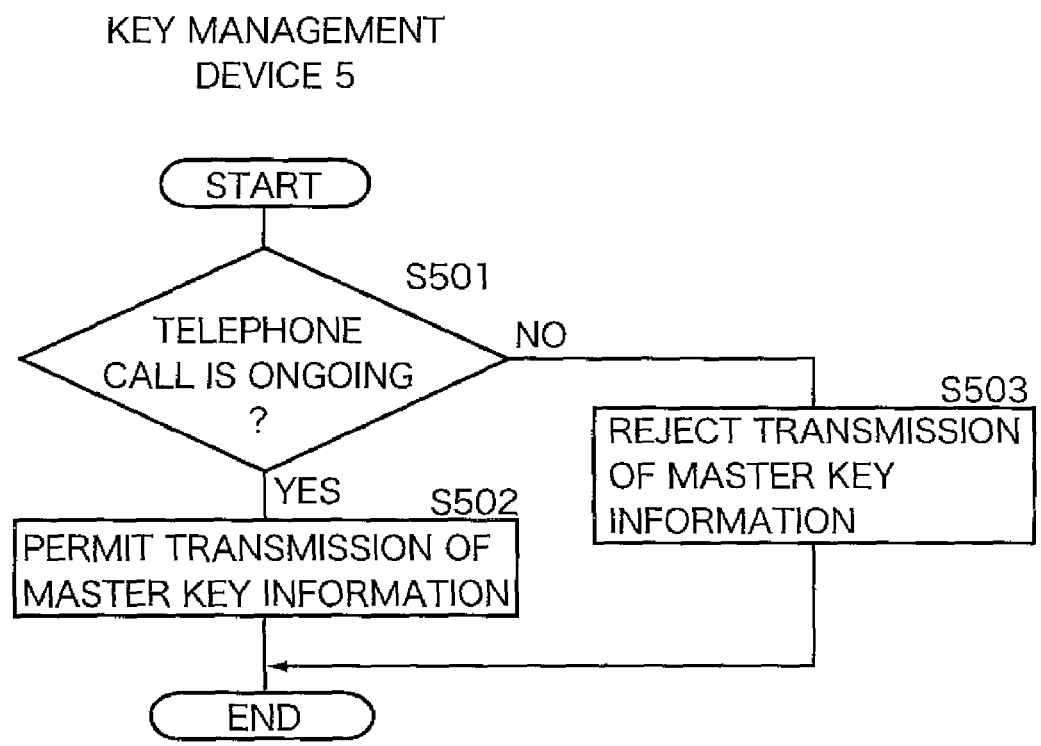
FIG. 11 is a flow chart for illustrating an exemplary transmission determination process of the key management device used in the communication system according to Embodiment 1.

FIG. 11 is a flow chart for illustrating an exemplary transmission determination process of the key management device 5 used in the communication system according to Embodiment 1. The key management device 5 executes the transmission determination process in Step S403 of the switching process described with reference to FIG. 10. Due to the control of the control section 50 for executing the computer program 500, the key management device 5 determines whether or not the communication device 1 is making a phone call via the first relay device 2a (S501). In Step S501, whether or not a phone call is being made is determined by making reference to an item of communication status of a record concerning the communication device 1, which is stored in the relay key table 52a.

In Step S501, if it is determined that a phone call is being made (i.e., if the answer is YES in S501), the key management device 5 permits, due to the control of the control section 50, the transmission of the master key information (S502), thus finishing the transmission determination process.

In Step S501, if it is determined that a phone call is not being made (i.e., if the answer is NO in S501), the key management device 5 rejects, due to the control of the control section 50, the transmission of the master key information (S503), thus finishing the transmission determination process. If the transmission of the master key information has been rejected as described in Step S503, the key management device 5 aborts the processes subsequent to the above-described switching process. It should be noted that, although the present embodiment has described the process for determining whether or not the transmission of the master key information is permitted based only on the communication status, various limiting conditions such as a limitation on the second relay device 2b from which the request is made and a limitation imposed by a time period may be provided, and the respective limiting conditions may be taken into consideration to make the determination. In that case, such limiting conditions are stored in an item of allowance or disallowance of high-speed switching in the relay key table 52a.

Figure 12:
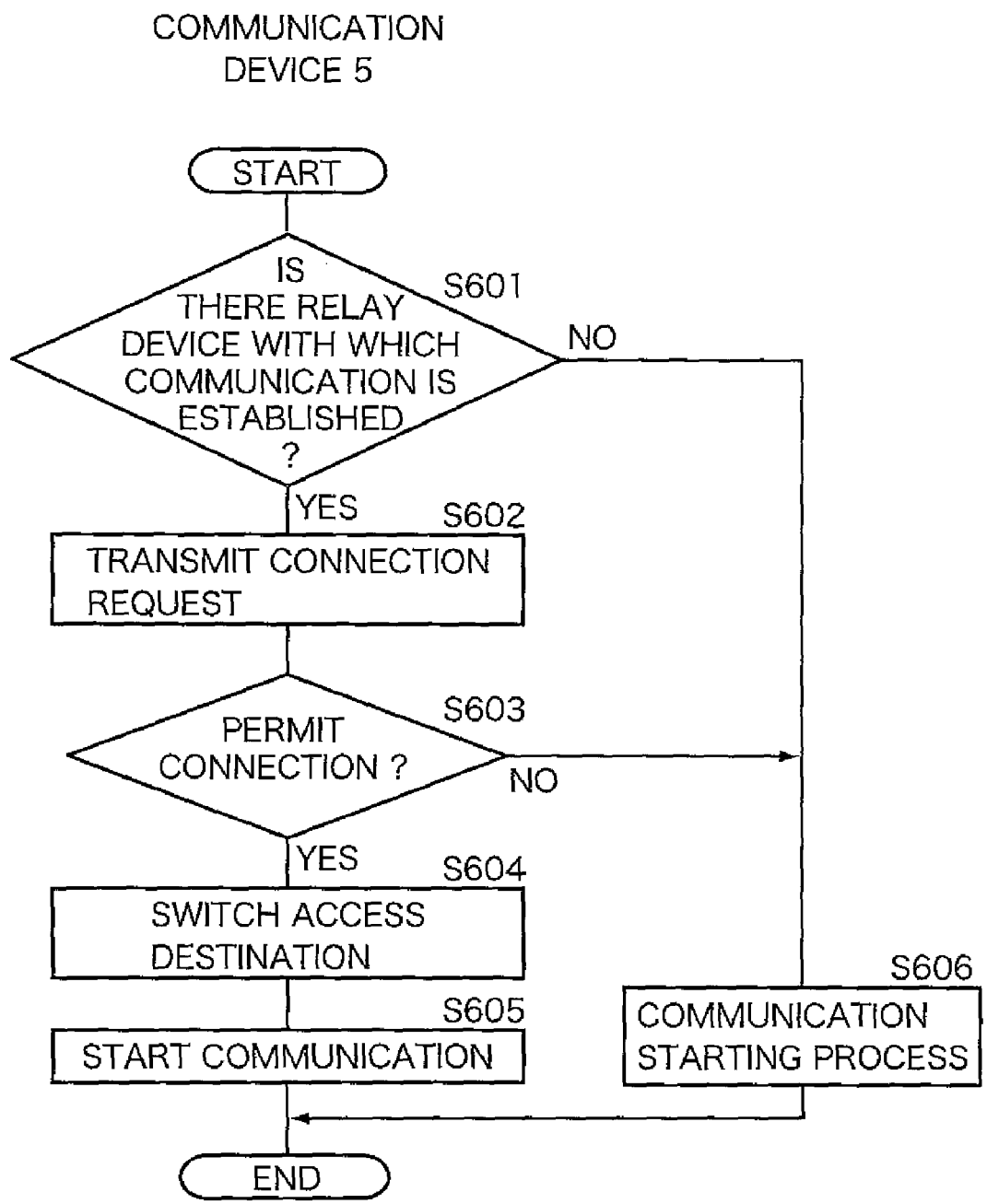
FIG. 12 is a flow chart for illustrating an exemplary switching process for the communication device used in the communication system according to Embodiment 1.

FIG. 12 is a flow chart for illustrating an exemplary switching process for the communication device 1 used in the communication system according to Embodiment 1. The process concerning the communication device 1 in the switching process described with reference to FIG. 10 will be described in more detail. Due to the control of the control section 10, if the relay device 2 (the second relay device 2b) is selected as an access destination, the communication device 1 determines whether or not there is the relay device 2 (the first relay device 2a) with which communication is currently established as an access destination (S601).

In Step S601, if it is determined that there is the first relay device 2a with which communication is currently established as an access destination (i.e., if the answer is YES in S601), due to the control of the control section 10, the communication device 1 transmits a connection request for requesting a connection to the access destination to the second relay device 2b from the communication section 13 (S602). The process of Step S602 corresponds to that of Step S410 shown in FIG. 10.

Then, due to the control of the control section 10, the communication device 1 determines whether or not the connection has been permitted in response to the transmitted connection request (S603). In Step S603, if the connection permission information in response to the connection request has been received, it is determined that the connection has been permitted, and if the information rejecting the connection has been received or the connection permission information has not been received even after a predetermined period of time had passed, it is determined that the connection has been rejected.

In Step S603, if it is determined that the connection permission information has been received (i.e., if the answer is YES in Step S603), due to the control of the control section 10, the communication device 1 switches the access destination from the first relay device 2a to the second relay device 2b (S604), and then starts the communication with the second relay device 2b (S605). The process of Step S605 corresponds to that of Step S413 shown in FIG. 10.

If it is determined in Step S601 that there is no first relay device 2a with which communication is established as an access destination (i.e., if the answer is NO in Step S601), or if it is determined in Step S603 that the connection has been rejected (i.e., if the answer is NO in S603), due to the control of the control section 10, the communication device 1 carries out mutual authentication with the second relay device 2b, and then executes a communication starting process for sharing the master key information (S606). The communication starting process of Step S606 corresponds to the communication starting process described with reference to FIG. 7. It should be noted that, if the switching process described with reference to FIG. 12 is combined with a conventional PMK cache method, and the second relay device 2b has been selected as an access destination in the past, the communication may be carried out based on the stored master key information.

As apparent from the transmission determination process shown in FIG. 11 and the switching process shown in FIG. 12, if the communication device 1 is not making a phone call, the communication starting process will be executed again. This is because if a phone call is not being made, a period of time required for the communication starting process is not a big problem, and the security can be improved by avoiding the reuse of the master key information and carrying out the authentication again.

Embodiment 2

Embodiment 2 is based on Embodiment 1, but adopts a form in which a key management device manages master key information by storing the master key information in a relay key table. It should be noted that the same constituent elements as those in Embodiment 1 are identified by the same reference numerals as those in Embodiment 1, and the detailed description thereof will be omitted. An exemplary configuration of a communication system according to Embodiment 2 is similar to that of the communication system according to Embodiment 1; therefore, reference will be made to Embodiment 1, and the description thereof will be omitted. Exemplary configurations of the communication device 1, the relay device 2, the call control device 3 and the authentication device 4 used in the communication system according to Embodiment 2 are similar to those of the communication device 1, the relay device 2, the call control device 3 and the authentication device 4 according to Embodiment 1; therefore, reference will be made to Embodiment 1, and the description thereof will be omitted. An exemplary hardware configuration of the key management device 5 used in the communication system according to Embodiment 2 is similar to that of the key management device 5 according to Embodiment 1; therefore, reference will be made to Embodiment 1, and the description thereof will be omitted.

Figure 13:
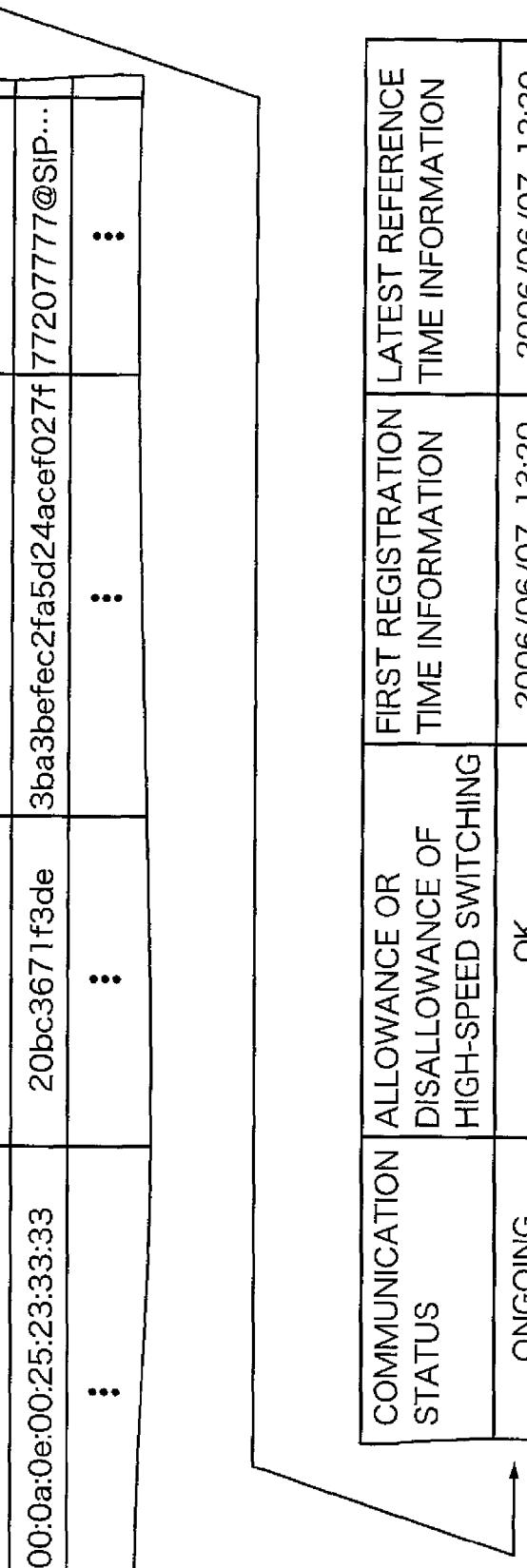
FIG. 13 is a schematic diagram for conceptually illustrating an exemplary content stored in a relay key table included in a key management device used in a communication system according to Embodiment 2.

FIG. 13 is a schematic diagram for conceptually illustrating an exemplary content stored in the relay key table 52a included in the key management device 5 used in the communication system according to Embodiment 2. In the relay key table 52a, various pieces of information are stored as records associated with each other. The various pieces of information stored in the relay key table 52a include: communication device identification information; key identification information; master key information; an SIP address; a communication status; an allowance or disallowance of high-speed switching; first registration time information; and the latest reference time information. In Embodiment 2, in addition to the key identification information, the master key information is stored in the relay key table 52a.

Next, the processes of various kinds of the devices used in the communication system according to the present embodiment will be described. The communication starting process of the communication device 1, the relay device 2 and the authentication device 4 used in the communication system according to Embodiment 2 is similar to that of the communication device 1, the relay device 2 and the authentication device 4 used in the communication system according to Embodiment 1; therefore, reference will be made to Embodiment 1, and the description thereof will be omitted.

Figure 14:
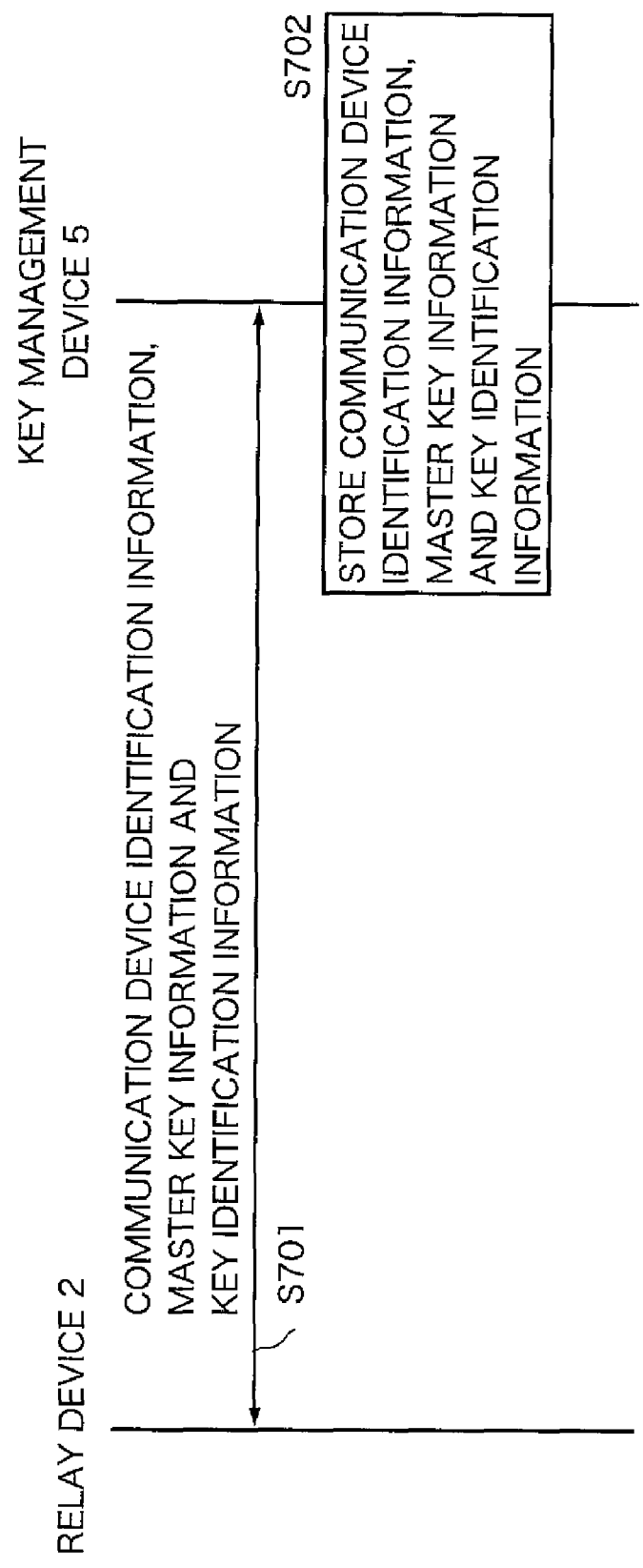
FIG. 14 is a sequence diagram for illustrating an exemplary master key information storing process of a relay device and the key management device, which are used in the communication system according to Embodiment 2.

FIG. 14 is a sequence diagram for illustrating an exemplary master key information storing process of the relay device 2 and the key management device 5, which are used in the communication system according to Embodiment 2. In Embodiment 2, as an alternative to the key identification information storing process of Embodiment 1, the master key information storing process is executed. Due to the control of the control section 20 for executing the computer program 200, the relay device 2, which has received the master key information and key identification information from the authentication device 4, transmits the communication device identification information concerning the communication device 1, to which transmission is made, as well as the received master key information and key identification information to the key management device 5 from the second communication section 23 (S701). In Embodiment 1, the master key information is transmitted if the transmission of the master key information is requested from the key management device 5; however, in Step S701 of Embodiment 2, even if the transmission of the master key information has not been requested, i.e., when the mutual authentication with the communication device 1 has been succeeded, the master key information is transmitted regardless of the presence or absence of the request for the transmission of the master key information.

Due to the control of the control section 50 for executing the computer program 500, the key management device 5 receives the communication device identification information, the master key information and the key identification information at the communication section 54, and then stores the received communication device identification information, the master key information and the key identification information in the relay key table 52a of the storage section 52 (S702). Thus, the master key information storing process is carried out.

The call control-related process of the relay device 2, the call control device 3 and the key management device 5, which are used in the communication system according to Embodiment 2, is similar to that of the relay device 2, the call control device 3 and the key management device 5 according to Embodiment 1; therefore, reference will be made to Embodiment 1, and the description thereof will be omitted.

Figure 15:
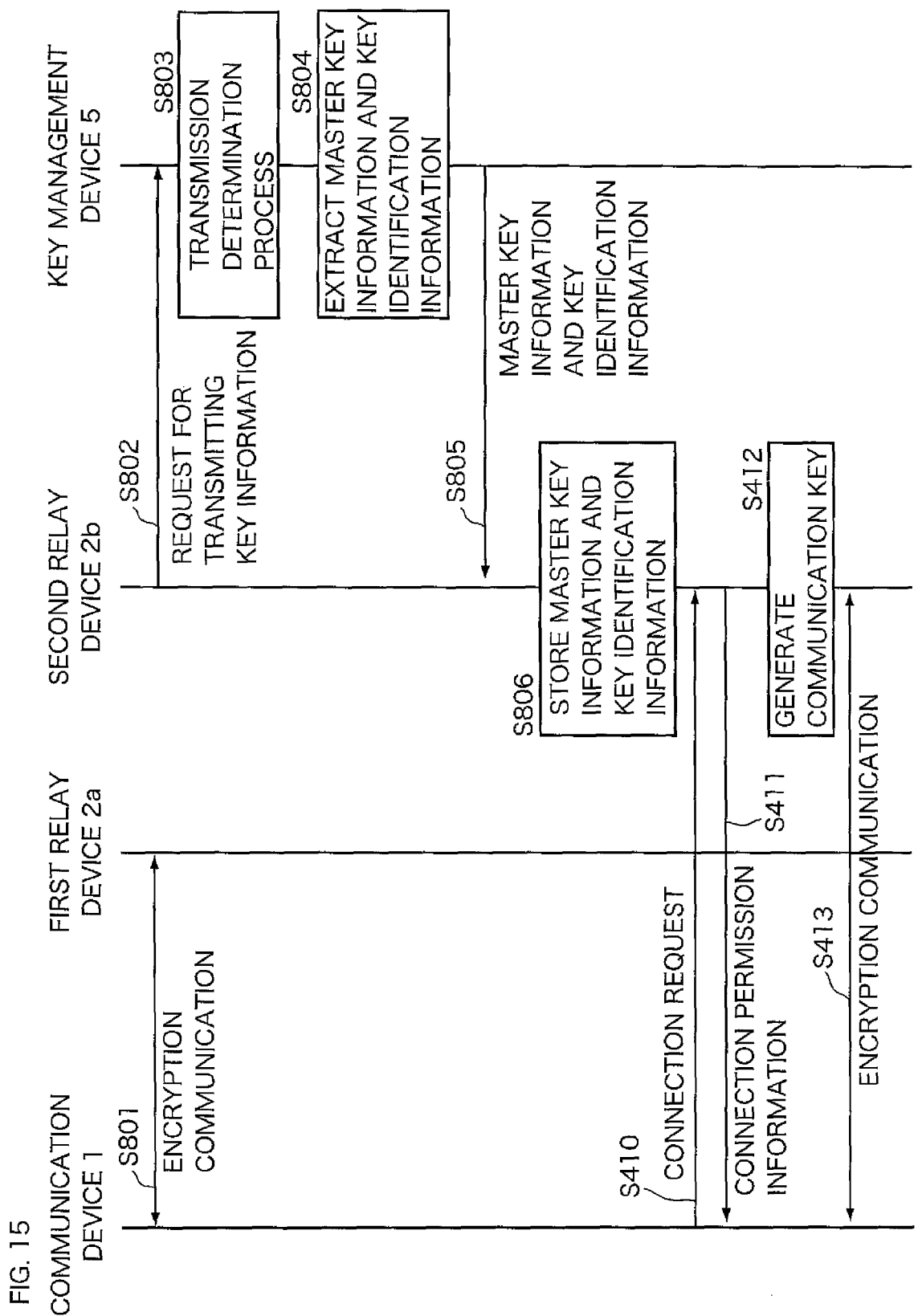
FIG. 15 is a sequence diagram for illustrating an exemplary switching process for a terminal device, the relay devices and the key management device, which are used in the communication system according to Embodiment 2.

FIG. 15 is a sequence diagram for illustrating an exemplary switching process for the terminal device 1, the relay devices 2 and the key management device 5, which are used in the communication system according to Embodiment 2. Due to the above-described various processes, the communication device 1 and the first relay device 2a execute encryption communication concerning IP phone communication in which the communication in a wireless zone is encrypted (S801).

There is a case where the communication device 1 communicating with the first relay device 2a moves and enters a communication area of the second relay device 2b, and the communication with the second relay device 2b becomes possible. In that case, due to the control of the control section 20 for executing the computer program 200, the second relay device 2b transmits a key information transmission request for requesting the transmission of master key information, required for the communication with the communication device 1, to the key management device 5 from the second communication section 23 (S802). The key information transmission request, transmitted in Step S802, indicates the communication device identification information for identifying the communication device 1 with which communication has been enabled.

Due to the control of the control section 50 for executing the computer program 500, the key management device 5 receives the key information transmission request at the communication section 54, and then executes a transmission determination process for determining whether or not the transmission of master key information is permitted in response to the received key information transmission request (S803).

Due to the control of the control section 50, the key management device 5 extracts, from the relay key table 52a of the storage section 52, the master key information and key identification information which are stored so as to be associated with the communication device identification information indicated by the key information transmission request (S804), and then transmits the extracted master key information and key identification information to the second relay device 2b from the communication section 54 (S805).

Due to the control of the control section 50, the second relay device 2b receives the master key information and key identification information at the second communication section 23, and then stores the received master key information and key identification information in the communication key table 21a of the storage section 21 so as to be associated with the communication device identification information for identifying the communication device 1 with which communication has been enabled (S806). The subsequent process steps are similar to Step S410 and the subsequent process steps of the switching process shown in FIG. 10 of Embodiment 1; therefore, these subsequent process steps are identified by the same reference numerals as those in Embodiment 1, and the description thereof will be omitted. Thus, the switching process is carried out.

The transmission determination process of the key management device 5 used in the communication system according to Embodiment 2 is similar to that of the key management device 5 according to Embodiment 1; therefore, reference will be made to Embodiment 1, and the description thereof will be omitted. Further, the switching process of the communication device 1 used in the communication system according to Embodiment 2 is similar to that of the communication device 1 according to Embodiment 1; therefore, reference will be made to Embodiment 1, and the description thereof will be omitted.

Embodiment 3

Embodiment 3 is based on Embodiment 1, but adopts a form in which the second relay device receives connection request transmitted from communication device, and then transmits key information transmission request to the key management device. It should be noted that the same constituent elements as those in Embodiment 1 are identified by the same reference numerals as those in Embodiment 1, and the detailed description thereof will be omitted. An exemplary configuration of a communication system according to Embodiment 3 is similar to that of the communication system according to Embodiment 1; therefore, reference will be made to Embodiment 1, and the description thereof will be omitted. Exemplary configurations of the communication device 1, the relay device 2, the call control device 3 and the authentication device 4 used in the communication system according to Embodiment 3 are similar to those of the communication device 1, the relay device 2, the call control device 3 and the authentication device 4 according to Embodiment 1; therefore, reference will be made to Embodiment 1, and the description thereof will be omitted. An exemplary hardware configuration of the key management device 5 used in the communication system according to Embodiment 3 is similar to that of the key management device 5 according to Embodiment 1; therefore, reference will be made to Embodiment 1, and the description thereof will be omitted.

Next, the processes of various kinds of the devices used in the communication system according to the present embodiment will be described. The communication starting process of the communication device 1, the relay device 2 and the authentication device 4 used in the communication system according to Embodiment 3 is similar to that of the communication device 1, the relay device 2 and the authentication device 4 used in the communication system according to Embodiment 1; therefore, reference will be made to Embodiment 1, and the description thereof will be omitted.

Figure 16:
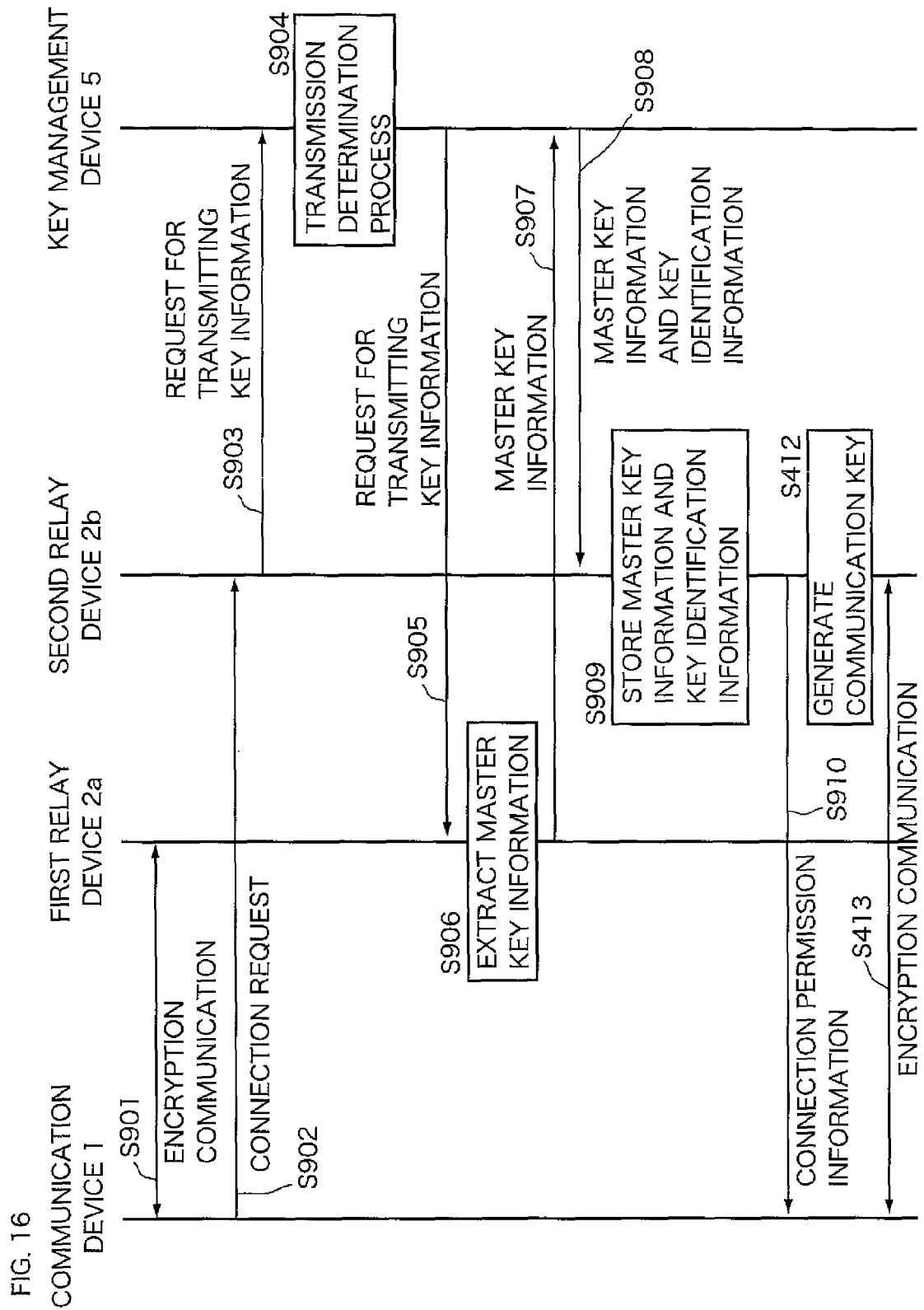
FIG. 16 is a sequence diagram for illustrating an exemplary switching process for the communication device, the relay devices and the key management device, which are used in the communication system according to Embodiment 3.

FIG. 16 is a sequence diagram for illustrating an exemplary switching process for the communication device 1, the relay devices 2 and the key management device 5, which are used in the communication system according to Embodiment 3. Due to the above-described various processes, the communication device 1 and the first relay device 2a carry out encryption communication concerning IP phone communication in which the communication in a wireless zone is encrypted (S901).

There is a case where the communication device 1 communicating with the first relay device 2a moves and enters a communication area of the second relay device 2b, and the communication with the second relay device 2b is enabled. In that case, due to the control of the control section 10, the communication device 1 selects a next access destination to the second relay device 2b and transmits a connection request for requesting a connection to the selected second relay device 2b from the communication section 13 (S902). The connection request in Step S902 indicates the communication device identification information for identifying the communication device 1 from which the request is made, and the key identification information which is stored in the communication device 1.

The second relay device 2b judges that a communication with the communication device 1 became possible, when the connection request is received from the communication device 1, at the first communication section 22. The second relay device 2, which judged that the communication with the communication device 1, due to the control of the control section 20 for executing the computer program 200, transmits a key information transmission request for requesting transmission of the master key information, required for the communication with the communication device 1, to the key management device 5 from the second communication section 23 (S903). The key information transmission request, transmitted in Step S903, indicates the communication device identification information for identifying the communication device 1 with which communication has been enabled.

Due to the control of the control section 50 for executing the computer program 500, the key management device 5 receives the key information transmission request at the communication section 54, and then executes a transmission determination process for determining whether or not the transmission of master key information is permitted in response to the received key information transmission request (S904). The transmission determination process in Step S904 is similar to that of the transmission determination process according to Embodiment 1; therefore, reference will be made to Embodiment 1, and the description thereof will be omitted.

Due to the control of the control section 50, the key management device 5 transmits the key information transmission request for requesting the transmission of the master key information, identified by the key identification information indicates the key information transmission request, to the first relay device 2a from the communication section 54 (S905). The key information transmission request, transmitted in Step S905, indicates the key identification information. The key management device 5 identifies the first relay device 2a with which communication is being established by using various method explained in the Embodiment 1.

Due to the control of the control section 20 for executing the computer program 200, the first relay device 2a receives the key identification information at the second communication section 23 to extract, from the communication key table 21a of the storage section 21, the master key information stored so as to be associated with the received key identification information (S906), and then transmits the extracted master key information to the key management device 5 from the second communication section 23 (S907).

Due to the control of the control section 50, the key management device 5 receives the master key information at the communication section 54, and then transmits the received master key information and the key identification information indicated in the key information transmission request received in Step 903 to the second relay device 2b from the communication section 54 (S908).

Due to the control of the control section 50, the second relay device 2b receives the master key information and key identification information at the second communication section 23, and then stores the received master key information and key identification information in the communication key table 21a of the storage section 21 so as to be associated with the communication device information indicated in the received communication request in Step 902, that is the communication device identification information for identifying the communication device 1 with which communication has been enabled (S909).

Due to the control of the control section 20, the second relay device 2b receives the connection request at the first communication section 22, and then checks the communication device identification information and key identification information, indicated by the received connection request, against the content stored in the communication key table 21a of the storage section 21. Thus, the second relay device 2b determines the validity of the connection request, and then transmits connection permission information for permitting the connection to the communication device 1 from the first communication section 22 (S910). The subsequent process is similar to the subsequent process of Embodiment 1; therefore, these subsequent process steps are identified by the same reference numerals as those in Embodiment 1, and the description thereof will be omitted. Thus, the switching process is carried out.

Embodiment 4

Embodiment 4 is based on Embodiment 2, but adopts a form in which the second relay device receives connection request transmitted from communication device, and then transmits key information transmission request to the key management device. It should be noted that the same constituent elements as those in Embodiment 1 or 2 are identified by the same reference numerals as those in Embodiment 1 or 2, and the detailed description thereof will be omitted. An exemplary configuration of a communication system according to Embodiment 4 is similar to that of the communication system according to Embodiment 1; therefore, reference will be made to Embodiment 1, and the description thereof will be omitted. Exemplary configurations of the communication device 1, the relay device 2, the call control device 3 and the authentication device 4 used in the communication system according to Embodiment 4 are similar to those of the communication device 1, the relay device 2, the call control device 3 and the authentication device 4 according to Embodiment 1; therefore, reference will be made to Embodiment 1, and the description thereof will be omitted. An exemplary hardware configuration of the key management device 5 used in the communication system according to Embodiment 4 is similar to that of the key management device 5 according to Embodiment 2; therefore, reference will be made to Embodiment 1, and the description thereof will be omitted.

Next, the processes of various kinds of the devices used in the communication system according to the present embodiment will be described. The communication starting process to the executing process encryption communication concerning IP phone communication of the communication device 1, the relay device 2 and the authentication device 4 used in the communication system according to Embodiment 4 is similar to that of the communication device 1, the relay device 2 and the authentication device 4 used in the communication system according to Embodiment 1; therefore, reference will be made to Embodiment 1, and the description thereof will be omitted.

FIG. 17 is a sequence diagram for illustrating an exemplary switching process for the terminal device 1, the relay devices 2 and the key management device 5, which are used in the communication system according to Embodiment 2. Due to the above-described various processes, the communication device 1 and the first relay device 2a execute encryption communication concerning IP phone communication in which the communication in a wireless zone is encrypted (S801).

There is a case where the communication device 1 communicating with the first relay device 2a moves and enters a communication area of the second relay device 2b, and the communication with the second relay device 2b is enabled. In that case, due to the control of the control section 10, the communication device 1 selects a next access destination to the second relay device 2b and transmits a connection request for requesting a connection to the selected second relay device 2b from the communication section 13 (S1002). The connection request in Step S1002 indicates the communication device identification information for identifying the communication device 1 from which the request is made, and the key identification information.

The second relay device 2b judges that a communication with the communication device 1 from which the request is made, is enable, when the connection request is received at the first communication section 22. The second relay device 2, which judged that the communication with the communication device 1, due to the control of the control section 20 for executing the computer program 200, transmits a key information transmission request for requesting transmission of the master key information, required for the communication with the communication device 1, to the key management device 5 from the second communication section 23 (S1003). The key information transmission request, transmitted in Step S1003, indicates the communication device identification information for identifying the communication device 1 with which communication has been enabled.

Due to the control of the control section 50 for executing the computer program 500, the key management device 5 receives the key information transmission request at the communication section 54, and then executes a transmission determination process for determining whether or not the transmission of master key information is permitted in response to the received key information transmission request (S1004). The transmission determination process in Step S1004 is similar to that of the transmission determination process according to Embodiment 1; therefore, reference will be made to Embodiment 1, and the description thereof will be omitted.

Due to the control of the control section 50, the key management device 5 extracts, from the relay key table 52*a* of the storage section 52, the master key information which is identified by the communication device identification information indicated by the key information transmission request (S1005), and then transmits the extracted master key information and key identification information to the second relay device 2*b* from the communication section 54 (S1006).

Due to the control of the control section 50, the second relay device 2*b* receives the master key information and key identification information at the second communication section 23, and then stores the received master key information and key identification information in the communication key table 21*a* of the storage section 21 (S806). The subsequent process steps are similar to Step S411 and the subsequent process steps of the switching process shown in FIG. 10 of Embodiment 1; therefore, these subsequent process steps are identified by the same reference numerals as those in Embodiment 1, and the description thereof will be omitted. Thus, the switching process is carried out.

Since the foregoing embodiments have been described only as part of examples of innumerable forms of the present invention, the present invention will not be limited to the above-described examples, and therefore, the present invention can be developed into various forms in accordance with various factors such as its object and usage. For example, although the communication device has been described as a portable IP phone in each of the foregoing embodiments, the present invention will not be limited to such a form, and a device such as a notebook computer may be used as the communication device. Furthermore, the present invention can be developed into various forms including a form in which communication other than telephone, such as streaming distribution of images, for example, is carried out.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication method comprising:
   transmitting a key information required for concealment of communications to a key management device from one relay device, which is communicating with a portable communication device having a function to make a phone call and using the key information;
   sending a request for transmission of the key information required for the communication with the portable communication device from another relay device which is become possible to communicate with the portable communication device;
   determining whether the portable communication device is making a phone call through said one relay device;
   transmitting the key information, which has been received from said one relay device, to said another relay device from the key management device, when it is determined that the portable communication device is making a phone call, but not transmitting the key information when it is determined that the portable communication device is not making a phone call; and
   allowing said another relay device to communicate with the portable communication device using the received key information.

2. A communication system comprising:
   a portable communication device;
   a plurality of relay devices capable of communicating with the portable communication device; and
   a key management device for transmitting/receiving key information required for concealment of communications to/from the relay devices,
   wherein one relay device communicating with the portable communication device using the key information comprises:
      a communication section for transmitting the key information to the key management device;
   another relay device comprises:
      a request section for sending a request to the key management device for transmission of the key information required for the communication with the portable communication device, when communication with the portable communication device becomes possible; and
   the key management device comprises:
      a communication section for transmitting the key information, which has been received from said one relay device, to said another relay device, and
   wherein said another relay device communicates with the portable communication device using the received key information,
   the portable communication device has a function to make a phone call,
   the key management device further comprises a determination section for determining whether the portable communication device is making a phone call through said one relay device, and
   the transmission of the key information is rejected, when it is determined that the portable communication device is not making a phone call.

3. The communication system according to claim 2, wherein
   said one relay device transmits identification information for identifying the key information associated with the portable communication device, which communication is being made, to the key management device through the communication section, and
   the key management device further comprises:

a storage section for storing the received key identification information; and a request section for sending a request to said one relay device for transmission of the key information identified by the stored key identification information in response to the request for the transmission of the key information from said another relay device; and wherein said one relay device transmits the key information through the communication section when the transmission of the key information is requested.

4. The communication system according to claim 3, wherein the key management device stores the key identification information in the storage section in accordance with communication device identification information for identifying the portable communication device concerning the communication of the key identification information, said another relay device makes a request for transmission of the key information by indicating the communication device identification information for identifying the portable communication device with which communication has been enabled, and the key management device further comprises an extraction section for extracting the key identification information in accordance with the communication device identification information from the storage section in response to the request.

5. The communication system according to claim 2, wherein said one relay device transmits the key information without receiving a request for transmission of the key information from the portable communication device, and the key management device further comprises:

a storage section for storing the received key information, wherein the stored key information is transmitted in response to a request for transmission of the key information from said another relay device.

6. The communication system according to claim 5, wherein the key management device stores the key information in the storage section in accordance with the communication device identification information for identifying the portable communication device concerning the communication of the key information, said another relay device makes a request for transmission of the key information by indicating the identification information for the portable communication device which becomes possible to communicate, and the key management device further comprises an extraction section for extracting the key information in accordance with the identification information for the communication device from the storage section in response to the request.

7. The communication system according to claim 2, wherein the portable communication device further comprises a request section for sending a connection request for requesting the connection to said another relay device, when communication with said another relay device becomes possible; wherein said another relay device determines that a communication with a portable communication device becomes possible, when the connection request, which has been sent from said portable communication device, is received.

8. The communication system according to claim 7, wherein said function to make a phone call is provided for an IP (Internet Protocol) phone communication, and the system further comprises a call control device for controlling a call connection concerning the IP phone communication of the portable communication device, the call control device comprises:

a communication section for transmitting status information, which indicates a status of the IP phone communication of the portable communication device, to the key management device, and the key management device determines whether the portable communication device is making a phone call based on the received status information by the determination section.

9. The communication system according to claim 2, wherein the portable communication device and each of the relay devices further comprise:

a derivation section for deriving a communication key required for encryption and decryption from the key information, wherein concealed communication in which communication content is encrypted and decrypted using the derived communication key.

10. The communication system according to claim 2, further comprising an authentication device for carrying out authentication concerning the communication with the portable communication device and the relay devices, wherein the authentication device comprises:

a communication section for transmitting the key information to the authenticated portable communication device and relay devices, and each of the relay devices further comprise:

a request section for sending a request to the authentication device for authenticating the communication device, when the key management device does not transmit the key information.

11. A non-transitory computer-readable medium embodied with a computer program comprising computer executable instructions for performing:

storing key information transmitted from one relay device, which is communicating with a portable communication device having a function to make a phone call based on the key information required for concealment of the communication;

determining whether the portable communication device is making a phone call through said one relay device; and transmitting the key information received from said one relay device to another relay device, when it is determined that the portable communication device is making a phone call and a request for transmission of the key information required for the communication with the portable communication device is accepted from said another relay device whose communication with the portable communication device becomes possible, but not transmitting the key information from said one relay device to another relay device when it is determined that the portable communication device is not making a phone call.

* * * * *